United States Patent
Jones

(10) Patent No.: US 8,126,793 B2
(45) Date of Patent: *Feb. 28, 2012

(54) AUTOMATED PAYMENT SYSTEM AND METHOD

(75) Inventor: John E. Jones, Winnetka, IL (US)

(73) Assignee: Cummins-Allison Corp., Mt. Prospect, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/973,139

(22) Filed: Dec. 20, 2010

(65) Prior Publication Data

US 2011/0087599 A1     Apr. 14, 2011

Related U.S. Application Data

(60) Continuation of application No. 11/649,394, filed on Jan. 3, 2007, now Pat. No. 7,882,000, which is a division of application No. 09/899,727, filed on Jul. 5, 2001, now Pat. No. 7,647,275.

(51) Int. Cl.
*G06Q 40/00* (2012.01)
(52) U.S. Cl. .............. 705/35; 705/39; 705/40
(58) Field of Classification Search ............... 705/35, 705/39, 40
See application file for complete search history.

(56) References Cited

U.S. PATENT DOCUMENTS

| | | |
|---|---|---|
| 2,669,998 A | 2/1954 | Buchholz |
| 2,750,949 A | 6/1956 | Kulo et al. |
| 2,835,260 A | 5/1958 | Buchholz |
| 2,936,684 A | 5/1960 | Simjian |
| 3,104,314 A | 9/1963 | Simjian |
| 3,148,932 A | 9/1964 | Simjian |
| 3,150,912 A | 9/1964 | Simjian |
| 3,246,295 A | 4/1966 | DeClaris et al. |
| 3,280,974 A | 10/1966 | Riddle et al. |
| 3,443,107 A | 5/1969 | Modglin |
| 3,480,785 A | 11/1969 | Aufderheide |

(Continued)

FOREIGN PATENT DOCUMENTS

CA     2 624 638 A1     12/2007

(Continued)

OTHER PUBLICATIONS

Litton Integrated Automation: Proceedings, SPIE—International Society for Optical Engineering, Optical Security and Anticounterfeiting Systems (vol. 1210), "High Speed Print Quality Inspection and Verification," by Cynthia Ott and Nagesh Chowla re MAVIS, 9 pages (Jan. 1990) [GL 010713-21].

(Continued)

*Primary Examiner* — Lalita Hamilton
(74) *Attorney, Agent, or Firm* — Nixon Peabody LLP

(57) ABSTRACT

An automated payment system for processing payment by a customer to a company. The payment system includes a document scanning system which has an input receptacle adapted to accept a document. After receiving an authorization agreement from the customer, the scanner acquires at least one image from the document. Also provided is a first computer adapted to receive images from the document scanning system. Adapted to communicate information represented by the image, a first communication link couples the document scanning system and the first computer. The payment system also includes a second computer adapted to receive images which is in communication with the first computer via a second communication link. The second communication link is adapted to communicate images and payment information.

20 Claims, 19 Drawing Sheets

U.S. PATENT DOCUMENTS

| | | |
|---|---|---|
| 3,496,370 A | 2/1970 | Haville et al. |
| 3,509,535 A | 4/1970 | Berube |
| 3,612,835 A | 10/1971 | Andrews et al. |
| 3,618,765 A | 11/1971 | Cooper et al. |
| 3,656,615 A | 4/1972 | Ptacek |
| 3,679,314 A | 7/1972 | Mustert |
| 3,715,031 A | 2/1973 | Okkonen |
| 3,725,667 A | 4/1973 | Schwartz |
| 3,764,899 A | 10/1973 | Peterson |
| 3,778,628 A | 12/1973 | Novak et al. |
| 3,782,543 A | 1/1974 | Martelli et al. |
| 3,798,603 A | 3/1974 | Wahlberg |
| 3,800,078 A | 3/1974 | Cochran et al. |
| 3,806,710 A | 4/1974 | Shigemori et al. |
| 3,815,021 A | 6/1974 | Kerr |
| 3,842,281 A | 10/1974 | Goodrich |
| 3,870,629 A | 3/1975 | Carter et al. |
| 3,906,449 A | 9/1975 | Marchak |
| 3,930,582 A | 1/1976 | Gartner et al. |
| 3,966,047 A | 6/1976 | Steiner |
| 3,976,198 A | 8/1976 | Carnes, Jr. et al. |
| 4,023,011 A | 5/1977 | Nakajima et al. |
| 4,027,142 A | 5/1977 | Paup et al. |
| 4,040,010 A | 8/1977 | Crane |
| 4,041,456 A | 8/1977 | Ott et al. |
| 4,096,991 A | 6/1978 | Iguchi |
| 4,109,238 A | 8/1978 | Creekmore |
| 4,114,027 A | 9/1978 | Slater |
| 4,114,804 A | 9/1978 | Jones et al. |
| 4,147,430 A | 4/1979 | Gorgone et al. |
| 4,166,945 A | 9/1979 | Inoyama et al. |
| 4,179,685 A | 12/1979 | O'Maley |
| 4,180,798 A | 12/1979 | Komori et al. |
| 4,187,463 A | 2/1980 | Kivenson |
| 4,187,498 A | 2/1980 | Creekmore |
| 4,197,986 A | 4/1980 | Nagata |
| 4,201,978 A | 5/1980 | Nally |
| 4,205,780 A | 6/1980 | Burns et al. |
| 4,231,014 A | 10/1980 | Ponzio |
| 4,231,561 A | 11/1980 | Kaneko et al. |
| 4,237,378 A | 12/1980 | Jones |
| 4,250,806 A | 2/1981 | Boyson et al. |
| 4,255,651 A | 3/1981 | Phillips |
| 4,264,808 A | 4/1981 | Owens et al. |
| 4,275,874 A | 6/1981 | DiBlasio |
| 4,277,774 A | 7/1981 | Fujii et al. |
| 4,283,708 A | 8/1981 | Lee |
| 4,288,781 A | 9/1981 | Sellner et al. |
| 4,302,781 A | 11/1981 | Ikeda et al. |
| 4,310,885 A | 1/1982 | Azcua et al. |
| 4,311,914 A | 1/1982 | Huber |
| 4,313,598 A | 2/1982 | DiBlasio |
| 4,321,672 A | 3/1982 | Braun et al. |
| 4,326,636 A | 4/1982 | Kawakami |
| 4,334,619 A | 6/1982 | Horino et al. |
| 4,337,864 A | 7/1982 | McLean |
| 4,321,612 A | 9/1982 | Bean et al. |
| 4,348,656 A | 9/1982 | Gorgone et al. |
| 4,349,111 A | 9/1982 | Shah et al. |
| 4,352,988 A | 10/1982 | Ishida |
| 4,355,300 A | 10/1982 | Weber |
| 4,355,369 A | 10/1982 | Garvin |
| 4,356,473 A | 10/1982 | Freudenthal |
| 4,360,034 A | 11/1982 | Davila et al. |
| 4,381,447 A | 4/1983 | Horvath et al. |
| 4,383,540 A | 5/1983 | DeMeyer et al. |
| 4,386,432 A | 5/1983 | Nakamura et al. |
| 4,396,902 A | 8/1983 | Warthan et al. |
| 4,416,299 A | 11/1983 | Bergman |
| 4,420,153 A | 12/1983 | Winkler et al. |
| 4,435,834 A | 3/1984 | Pauli et al. |
| 4,441,205 A | 4/1984 | Berkin et al. |
| 4,442,541 A | 4/1984 | Finkel et al. |
| 4,449,240 A | 5/1984 | Yoshida |
| 4,461,028 A | 7/1984 | Okubo |
| 4,464,786 A | 8/1984 | Nishito et al. |
| 4,464,787 A | 8/1984 | Fish et al. |
| RE31,692 E | 10/1984 | Tyburski et al. |
| 4,480,177 A | 10/1984 | Allen |
| 4,482,058 A | 11/1984 | Steiner |
| 4,487,306 A | 12/1984 | Nao et al. |
| 4,490,846 A | 12/1984 | Ishida et al. |
| 4,513,439 A | 4/1985 | Gorgone et al. |
| 4,521,008 A | 6/1985 | Granzow et al. |
| 4,523,330 A | 6/1985 | Cain |
| 4,530,067 A | 7/1985 | Dorr |
| 4,538,719 A | 9/1985 | Gray et al. |
| 4,539,702 A | 9/1985 | Oka |
| 4,542,829 A | 9/1985 | Emery et al. |
| 4,543,969 A | 10/1985 | Rasmussen |
| 4,544,266 A | 10/1985 | Antes |
| 4,547,896 A | 10/1985 | Ohtombe et al. |
| 4,553,222 A | 11/1985 | Kurland et al. |
| 4,553,846 A | 11/1985 | Hilton et al. |
| 4,556,140 A | 12/1985 | Okada |
| 4,558,224 A | 12/1985 | Gober |
| 4,559,451 A | 12/1985 | Curl |
| 4,563,771 A | 1/1986 | Gorgone et al. |
| 4,567,370 A | 1/1986 | Falls |
| 4,569,421 A | 2/1986 | Sandstedt |
| 4,582,172 A | 4/1986 | Takeuchi et al. |
| 4,584,529 A | 4/1986 | Aoyama |
| 4,587,412 A | 5/1986 | Apisdorf |
| 4,587,434 A | 5/1986 | Roes et al. |
| 4,590,606 A | 5/1986 | Rohrer |
| 4,592,090 A | 5/1986 | Curl et al. |
| 4,593,184 A | 6/1986 | Bryce |
| 4,594,664 A | 6/1986 | Hashimoto |
| 4,602,332 A | 7/1986 | Hirose et al. |
| 4,605,926 A | 8/1986 | Onishi et al. |
| 4,611,345 A | 9/1986 | Ohnishi et al. |
| 4,617,457 A | 10/1986 | Granzow et al. |
| 4,617,458 A | 10/1986 | Bryce |
| 4,628,194 A | 12/1986 | Dobbins et al. |
| 4,645,936 A | 2/1987 | Gorgone |
| 4,653,647 A | 3/1987 | Hashimoto |
| 4,658,289 A | 4/1987 | Nagano et al. |
| 4,676,343 A | 6/1987 | Humble et al. |
| 4,677,682 A | 6/1987 | Miyagawa et al. |
| 4,678,072 A | 7/1987 | Kobayashi et al. |
| 4,680,803 A | 7/1987 | Delella |
| 4,685,141 A | 8/1987 | Hoque et al. |
| 4,686,357 A | 8/1987 | Douno et al. |
| 4,694,963 A | 9/1987 | Takesako |
| 4,697,071 A | 9/1987 | Hiraoka et al. |
| 4,700,368 A | 10/1987 | Munn et al. |
| 4,716,456 A | 12/1987 | Hosaka |
| 4,733,308 A | 3/1988 | Nakamura et al. |
| 4,735,289 A | 4/1988 | Kenyon |
| 4,743,743 A | 5/1988 | Fukatsu |
| 4,743,974 A | 5/1988 | Lockwood |
| 4,748,679 A | 5/1988 | Gold et al. |
| 4,749,087 A | 6/1988 | Buttifant |
| 4,753,625 A | 6/1988 | Okada |
| 4,764,725 A | 8/1988 | Bryce |
| 4,764,976 A | 8/1988 | Kallin et al. |
| 4,768,100 A | 8/1988 | Kunishima et al. |
| 4,774,663 A | 9/1988 | Musmanno et al. |
| 4,782,328 A | 11/1988 | Denlinger |
| 4,784,274 A | 11/1988 | Mori et al. |
| 4,803,347 A | 2/1989 | Sugahara et al. |
| 4,806,709 A | 2/1989 | Evans |
| 4,811,004 A | 3/1989 | Person et al. |
| 4,817,176 A | 3/1989 | Marshall et al. |
| 4,821,332 A | 4/1989 | Durham |
| 4,823,393 A | 4/1989 | Kawakami |
| 4,825,246 A | 4/1989 | Fukuchi et al. |
| 4,827,531 A | 5/1989 | Milford |
| 4,837,842 A | 6/1989 | Holt |
| 4,841,358 A | 6/1989 | Kammoto et al. |
| 4,851,616 A | 7/1989 | Wales et al. |
| 4,877,230 A | 10/1989 | Winkler et al. |
| 4,880,096 A | 11/1989 | Kobayashi et al. |
| 4,881,268 A | 11/1989 | Uchida et al. |
| 4,883,181 A | 11/1989 | Yoshikawa |
| 4,888,812 A | 12/1989 | Dinan et al. |
| 4,903,953 A | 2/1990 | Winkler et al. |

| | | | | | |
|---|---|---|---|---|---|
| 4,905,839 A | 3/1990 | Yuge et al. | 5,335,292 A | 8/1994 | Lovelady et al. |
| 4,905,840 A | 3/1990 | Yuge et al. | 5,341,408 A | 8/1994 | Melcher et al. |
| 4,908,516 A | 3/1990 | West | 5,342,165 A | 8/1994 | Graef et al. |
| 4,922,109 A | 5/1990 | Bercovitz et al. | 5,363,949 A | 11/1994 | Matsubayashi |
| 4,928,094 A | 5/1990 | Smith | 5,367,577 A | 11/1994 | Gotaas |
| 4,931,782 A | 6/1990 | Jackson | 5,368,147 A | 11/1994 | Menke et al. |
| 4,947,441 A | 8/1990 | Hara et al. | 5,371,345 A | 12/1994 | LeStrange et al. |
| 4,948,174 A | 8/1990 | Thomson et al. | 5,371,798 A | 12/1994 | McWhortor |
| 4,954,697 A | 9/1990 | Kokubun et al. | 5,373,550 A | 12/1994 | Campbell et al. |
| 4,958,235 A | 9/1990 | Sims et al. | 5,379,344 A | 1/1995 | Larsson et al. |
| 4,960,981 A | 10/1990 | Benton et al. | 5,381,019 A | 1/1995 | Sato |
| 4,970,655 A | 11/1990 | Winn et al. | 5,383,754 A | 1/1995 | Sumida et al. |
| 4,973,851 A | 11/1990 | Lee | 5,394,969 A | 3/1995 | Harbaugh |
| 4,980,543 A | 12/1990 | Hara et al. | 5,399,874 A | 3/1995 | Gonsalves et al. |
| 4,984,280 A | 1/1991 | Abe | 5,402,895 A | 4/1995 | Mikkelsen et al. |
| 4,992,860 A | 2/1991 | Hamaguchi et al. | 5,416,307 A | 5/1995 | Danek et al. |
| 4,996,604 A | 2/1991 | Ogawa et al. | 5,417,316 A | 5/1995 | Harbaugh |
| 5,010,238 A | 4/1991 | Kadono et al. | 5,418,458 A | 5/1995 | Jeffers |
| 5,023,782 A | 6/1991 | Lutz et al. | 5,419,424 A | 5/1995 | Harbaugh |
| 5,027,415 A | 6/1991 | Hara et al. | 5,421,443 A | 6/1995 | Hatamachi et al. |
| 5,040,226 A | 8/1991 | Elischer et al. | 5,422,467 A | 6/1995 | Graef et al. .................... 235/379 |
| 5,047,871 A | 9/1991 | Meyer et al. | 5,430,664 A | 7/1995 | Cargill et al. |
| 5,054,621 A | 10/1991 | Murphy et al. | 5,434,427 A | 7/1995 | Crane et al. |
| 5,055,834 A | 10/1991 | Chiba | 5,437,357 A | 8/1995 | Ota et al. |
| 5,063,599 A | 11/1991 | Concannon et al. | 5,438,184 A | 8/1995 | Roberts et al. |
| 5,064,999 A | 11/1991 | Okamoto et al. | 5,442,162 A | 8/1995 | Armel |
| 5,068,519 A | 11/1991 | Bryce | 5,444,793 A | 8/1995 | Kelland |
| 5,076,441 A | 12/1991 | Gerlier | 5,444,794 A | 8/1995 | Uhland, Sr. |
| 5,091,961 A | 2/1992 | Baus, Jr. | 5,453,601 A | 9/1995 | Rosen ........................... 235/379 |
| 5,097,517 A | 3/1992 | Holt | 5,459,304 A | 10/1995 | Eisenmann |
| 5,105,364 A | 4/1992 | Kawamura et al. | 5,465,301 A | 11/1995 | Jotcham et al. |
| 5,105,601 A | 4/1992 | Horiguchi et al. | 5,465,821 A | 11/1995 | Akioka |
| 5,114,381 A | 5/1992 | Ueda et al. | 5,467,405 A | 11/1995 | Raterman et al. ............ 382/135 |
| 5,119,433 A | 6/1992 | Will | 5,467,406 A | 11/1995 | Graves et al. ................. 382/135 |
| 5,120,944 A | 6/1992 | Kern et al. | 5,468,941 A | 11/1995 | Sasaki |
| 5,122,754 A | 6/1992 | Gotaas | 5,468,971 A | 11/1995 | Ebstein et al. |
| 5,134,663 A | 7/1992 | Kozlowski | 5,469,241 A | 11/1995 | Takahashi et al. |
| 5,135,115 A | 8/1992 | Miller et al. | 5,476,169 A | 12/1995 | Takarada et al. |
| 5,144,115 A | 9/1992 | Yoshida | 5,481,377 A | 1/1996 | Udagawa et al. |
| 5,146,067 A | 9/1992 | Sloan et al. | 5,488,671 A | 1/1996 | Kern |
| 5,146,512 A | 9/1992 | Weideman et al. | 5,491,325 A | 2/1996 | Huang et al. |
| 5,151,607 A | 9/1992 | Crane et al. | 5,504,822 A | 4/1996 | Holt |
| 5,154,272 A | 10/1992 | Nishiumi et al. | 5,506,691 A | 4/1996 | Bednar et al. |
| 5,159,548 A | 10/1992 | Caslavka | 5,509,692 A | 4/1996 | Oz |
| 5,163,672 A | 11/1992 | Mennie ......................... 271/187 | D369,984 S | 5/1996 | Larsen ........................... D10/97 |
| 5,163,868 A | 11/1992 | Adams et al. | 5,523,575 A | 6/1996 | Machida et al. |
| 5,167,313 A | 12/1992 | Dobbins et al. | 5,530,772 A | 6/1996 | Storey |
| 5,179,517 A | 1/1993 | Sarbin et al. | 5,530,773 A | 6/1996 | Thompson |
| 5,183,142 A | 2/1993 | Latchinian et al. | 5,537,486 A | 7/1996 | Stratigos et al. |
| 5,184,115 A | 2/1993 | Black et al. | 5,544,043 A | 8/1996 | Miki et al. |
| 5,184,709 A | 2/1993 | Nishiumi et al. | 5,544,086 A | 8/1996 | Davis et al. |
| 5,186,334 A | 2/1993 | Fukudome et al. | 5,545,885 A | 8/1996 | Jagielinski |
| 5,187,750 A | 2/1993 | Behera | 5,564,546 A | 10/1996 | Molbak et al. |
| 5,191,525 A | 3/1993 | LeBrun et al. | 5,586,036 A | 12/1996 | Pintsov |
| 5,193,121 A | 3/1993 | Elischer et al. | 5,590,196 A | 12/1996 | Moreau |
| 5,198,976 A | 3/1993 | Form et al. | 5,592,377 A | 1/1997 | Lipkin |
| 5,199,543 A | 4/1993 | Kamagami et al. | 5,592,561 A | 1/1997 | Moore |
| 5,201,395 A | 4/1993 | Takizawa et al. | 5,594,225 A | 1/1997 | Botvin |
| 5,207,788 A | 5/1993 | Geib et al. ..................... 271/122 | 5,600,704 A | 2/1997 | Ahlberg et al. |
| 5,220,501 A | 6/1993 | Lawlor et al. | 5,600,732 A | 2/1997 | Ott et al. |
| 5,231,381 A | 7/1993 | Duwaer | 5,602,933 A | 2/1997 | Blackwell et al. |
| 5,237,158 A | 8/1993 | Kern et al. | 5,602,936 A | 2/1997 | Green et al. |
| 5,237,159 A | 8/1993 | Stephens et al. | 5,607,040 A | 3/1997 | Mathurin, Sr. |
| 5,239,593 A | 8/1993 | Wittner et al. | 5,615,280 A | 3/1997 | Izawa et al. |
| 5,251,738 A | 10/1993 | Dobrowski | 5,616,902 A | 4/1997 | Cooley et al. |
| 5,252,811 A | 10/1993 | Henochowicz et al. | 5,620,079 A | 4/1997 | Molbak |
| 5,261,518 A | 11/1993 | Bryce | 5,633,949 A | 5/1997 | Graves et al. ................. 382/135 |
| 5,265,008 A | 11/1993 | Benton et al. | 5,640,463 A | 6/1997 | Csulits ........................... 382/135 |
| 5,272,641 A | 12/1993 | Ford et al. | 5,652,802 A | 7/1997 | Graves et al. ................. 382/135 |
| 5,274,641 A | 12/1993 | Shobatake et al. | 5,657,846 A | 8/1997 | Schwartz |
| 5,279,403 A | 1/1994 | Harbaugh et al. | 5,671,282 A | 9/1997 | Wolff et al. |
| 5,286,954 A | 2/1994 | Sato et al. | 5,678,046 A | 10/1997 | Cahill et al. |
| 5,295,196 A | 3/1994 | Raterman et al. ............. 382/135 | 5,680,472 A | 10/1997 | Conant |
| 5,297,030 A | 3/1994 | Vassigh et al. | 5,687,963 A | 11/1997 | Mennie ......................... 271/119 |
| 5,304,813 A | 4/1994 | DeMan | 5,692,067 A | 11/1997 | Raterman et al. ............ 382/135 |
| 5,308,992 A | 5/1994 | Crane et al. | 5,703,344 A | 12/1997 | Bezy et al. ..................... 235/379 |
| 5,309,515 A | 5/1994 | Troung et al. | 5,704,491 A | 1/1998 | Graves ........................... 209/534 |
| 5,317,140 A | 5/1994 | Dunthorn | 5,719,948 A | 2/1998 | Liang |
| 5,321,238 A | 6/1994 | Kamata et al. | 5,724,438 A | 3/1998 | Graves ........................... 382/135 |

| | | | | | | | |
|---|---|---|---|---|---|---|---|
| 5,727,667 | A | 3/1998 | Nye | 6,351,551 | B1 | 2/2002 | Munro et al. ............... 382/135 |
| 5,729,623 | A | 3/1998 | Omatu et al. | 6,351,552 | B1 | 2/2002 | Weaver et al. ............. 382/135 |
| 5,751,840 | A | 5/1998 | Raterman et al. ............ 382/135 | 6,354,491 | B2 | 3/2002 | Nichols et al. |
| 5,751,842 | A | 5/1998 | Riach et al. | 6,363,164 | B1 | 3/2002 | Jones et al. ............... 382/135 |
| 5,754,673 | A | 5/1998 | Brooks et al. | 6,363,362 | B1 * | 3/2002 | Burfield et al. ............... 705/40 |
| 5,761,089 | A | 6/1998 | McInerny | 6,371,303 | B1 | 4/2002 | Klein et al. ................. 209/534 |
| 5,781,654 | A | 7/1998 | Carney | 6,373,965 | B1 | 4/2002 | Liang |
| 5,790,693 | A | 8/1998 | Graves et al. ............... 382/135 | 6,378,683 | B2 | 4/2002 | Mennie ...................... 194/207 |
| 5,790,697 | A | 8/1998 | Munro et al. | 6,381,354 | B1 | 4/2002 | Mennie et al. ............. 382/135 |
| 5,799,767 | A | 9/1998 | Molbak | 6,398,000 | B1 | 6/2002 | Jenrick et al. ............... 194/200 |
| 5,806,650 | A | 9/1998 | Mennie et al. ............. 194/206 | 6,415,983 | B1 | 7/2002 | Ulvr et al. |
| 5,813,510 | A | 9/1998 | Rademacher | 6,459,806 | B1 | 10/2002 | Raterman et al. ......... 382/135 |
| 5,815,592 | A | 9/1998 | Mennie et al. ............. 382/135 | 6,460,705 | B1 | 10/2002 | Hallowell ................... 209/534 |
| 5,822,448 | A | 10/1998 | Graves et al. .............. 382/135 | 6,473,519 | B1 | 10/2002 | Pidhirny et al. |
| 5,830,054 | A | 11/1998 | Petri | 6,493,461 | B1 | 12/2002 | Mennie et al. ............. 382/135 |
| 5,832,104 | A | 11/1998 | Graves et al. .............. 382/135 | 6,516,078 | B1 | 2/2003 | Yang et al. |
| 5,832,463 | A | 11/1998 | Funk | 6,539,104 | B1 | 3/2003 | Raterman et al. ......... 382/135 |
| 5,842,188 | A | 11/1998 | Ramsey et al. | 6,540,090 | B1 | 4/2003 | Sakai et al. ................. 209/534 |
| 5,852,811 | A | 12/1998 | Atkins | 6,546,351 | B1 | 4/2003 | Haycock et al. |
| 5,867,589 | A | 2/1999 | Graves et al. ............... 382/135 | 6,550,671 | B1 | 4/2003 | Brown et al. |
| 5,870,487 | A | 2/1999 | Graves et al. ............... 382/135 | 6,560,355 | B2 | 5/2003 | Graves et al. ............. 382/135 |
| 5,870,725 | A | 2/1999 | Bellinger et al. | 6,573,983 | B1 | 6/2003 | Laskowski |
| 5,875,259 | A | 2/1999 | Mennie et al. ............. 382/135 | 6,574,377 | B1 | 6/2003 | Cahill et al. ................ 382/305 |
| 5,892,211 | A | 4/1999 | Davis et al. | 6,588,569 | B1 | 7/2003 | Jenrick et al. ............. 194/206 |
| 5,894,937 | A | 4/1999 | Schmidt | 6,601,687 | B1 | 8/2003 | Jenrick et al. ............. 194/206 |
| 5,905,810 | A | 5/1999 | Jones et al. ................. 382/135 | 6,603,872 | B2 | 8/2003 | Jones et al. ............... 382/135 |
| 5,909,502 | A | 6/1999 | Mazur ........................ 382/135 | 6,611,351 | B1 * | 8/2003 | Simonoff ................... 358/1.18 |
| 5,909,503 | A | 6/1999 | Graves et al. .............. 382/135 | 6,621,919 | B2 | 9/2003 | Mennie et al. ............. 382/135 |
| 5,912,982 | A | 6/1999 | Munro et al. ............... 382/135 | 6,628,816 | B2 | 9/2003 | Mennie et al. ............. 382/135 |
| 5,917,930 | A | 6/1999 | Kayani et al. | 6,636,624 | B2 | 10/2003 | Raterman et al. ......... 382/135 |
| 5,918,748 | A | 7/1999 | Clark et al. | 6,637,576 | B1 | 10/2003 | Jones et al. |
| 5,923,413 | A | 7/1999 | Laskowski | 6,647,136 | B2 | 11/2003 | Jones et al. ............... 382/137 |
| 5,926,392 | A | 7/1999 | York et al. | 6,650,767 | B2 | 11/2003 | Jones et al. ............... 382/135 |
| 5,926,550 | A | 7/1999 | Davis | 6,654,486 | B2 | 11/2003 | Jones et al. ............... 382/135 |
| 5,930,778 | A | 7/1999 | Geer | 6,661,910 | B2 | 12/2003 | Jones et al. ............... 382/135 |
| 5,936,219 | A | 8/1999 | Yoshida et al. | 6,665,431 | B2 | 12/2003 | Jones et al. ............... 382/135 |
| 5,938,044 | A | 8/1999 | Weggesser | 6,678,401 | B2 | 1/2004 | Jones et al. ............... 382/135 |
| 5,940,623 | A | 8/1999 | Watts et al. | 6,678,402 | B2 | 1/2004 | Jones et al. ............... 382/135 |
| 5,940,844 | A | 8/1999 | Cahill et al. | 6,697,511 | B1 | 2/2004 | Haycock |
| 5,943,655 | A | 8/1999 | Jacobson ...................... 705/30 | 6,705,470 | B2 | 3/2004 | Klein et al. ................. 209/534 |
| 5,947,255 | A | 9/1999 | Shimada et al. | 6,721,442 | B1 | 4/2004 | Mennie et al. ............. 382/135 |
| 5,960,103 | A | 9/1999 | Graves et al. ............... 382/135 | 6,724,926 | B2 | 4/2004 | Jones et al. ............... 382/135 |
| 5,966,456 | A | 10/1999 | Jones et al. ................. 382/135 | 6,724,927 | B2 | 4/2004 | Jones et al. ............... 382/135 |
| 5,982,918 | A | 11/1999 | Mennie et al. ............. 382/135 | 6,731,785 | B1 | 5/2004 | Mennie et al. ............. 382/135 |
| 5,992,601 | A | 11/1999 | Mennie et al. ............. 194/207 | 6,731,786 | B2 | 5/2004 | Jones et al. ............... 382/135 |
| 6,012,565 | A | 1/2000 | Mazur ........................ 194/207 | 6,748,101 | B1 | 6/2004 | Jones et al. ............... 382/135 |
| 6,021,883 | A | 2/2000 | Casanova et al. | 6,778,693 | B2 | 8/2004 | Jones et al. ............... 382/135 |
| 6,023,684 | A | 2/2000 | Pearson | 6,786,398 | B1 | 9/2004 | Stinson et al. |
| 6,026,175 | A | 2/2000 | Munro et al. ............... 382/135 | 6,798,899 | B2 | 9/2004 | Mennie et al. ............. 382/135 |
| 6,028,951 | A | 2/2000 | Raterman et al. ............ 382/135 | 6,810,137 | B2 | 10/2004 | Jones et al. ............... 382/135 |
| 6,036,344 | A | 3/2000 | Goldenberg ................. 364/408 | 6,843,418 | B2 | 1/2005 | Jones et al. ............... 235/462.01 |
| 6,038,553 | A | 3/2000 | Hyde, Jr. | 6,860,375 | B2 | 3/2005 | Hallowell et al. ............ 194/328 |
| 6,045,039 | A | 4/2000 | Stinson et al. ............... 235/379 | 6,866,134 | B2 | 3/2005 | Stromme et al. ........... 194/207 |
| 6,065,672 | A | 5/2000 | Haycock | 6,868,954 | B2 | 3/2005 | Stromme et al. ........... 194/207 |
| 6,068,194 | A | 5/2000 | Mazur ........................ 235/492 | 6,880,692 | B1 | 4/2005 | Mazur et al. ............... 194/207 |
| 6,072,896 | A | 6/2000 | Graves et al. ............... 382/135 | 6,913,130 | B1 | 7/2005 | Mazur et al. ............... 194/207 |
| 6,073,744 | A | 6/2000 | Raterman et al. ............ 194/207 | 6,913,260 | B2 | 7/2005 | Maier et al. ............. 271/265.04 |
| 6,074,334 | A | 6/2000 | Mennie et al. ............. 493/438 | 6,915,893 | B2 | 7/2005 | Mennie ...................... 194/207 |
| 6,076,826 | A | 6/2000 | Gerlier et al. | 6,929,109 | B1 | 8/2005 | Klein et al. ................. 194/206 |
| 6,078,683 | A | 6/2000 | Denison et al. | 6,955,253 | B1 | 10/2005 | Mazur et al. ............... 194/207 |
| D427,623 | S | 7/2000 | Kuwada | 6,957,733 | B2 | 10/2005 | Mazur et al. ............... 194/215 |
| 6,097,834 | A | 8/2000 | Krouse et al. | 6,959,800 | B1 | 11/2005 | Mazur et al. ............... 194/207 |
| 6,101,266 | A | 8/2000 | Laskowski et al. | 6,962,247 | B2 | 11/2005 | Maier et al. ................ 194/207 |
| 6,105,007 | A | 8/2000 | Norris | 6,980,684 | B1 | 12/2005 | Munro et al. ............... 382/135 |
| 6,119,946 | A | 9/2000 | Teicher | 6,994,200 | B2 | 2/2006 | Jenrick et al. ............. 194/206 |
| 6,128,402 | A | 10/2000 | Jones et al. ................. 382/135 | 6,996,263 | B2 | 2/2006 | Jones et al. ............... 382/135 |
| 6,131,718 | A | 10/2000 | Witschorik | 7,000,828 | B2 | 2/2006 | Jones ......................... 235/379 |
| 6,141,438 | A | 10/2000 | Blanchester | 7,006,664 | B2 | 2/2006 | Paraskevakos |
| 6,145,738 | A | 11/2000 | Stinson et al. | 7,016,767 | B2 | 3/2006 | Jones et al. ................. 700/224 |
| 6,181,837 | B1 | 1/2001 | Cahill et al. | 7,034,324 | B2 | 4/2006 | Voser |
| 6,220,419 | B1 | 4/2001 | Mennie ........................ 194/207 | 7,036,651 | B2 | 5/2006 | Tam et al. ................... 194/217 |
| 6,237,739 | B1 | 5/2001 | Mazur et al. ............... 194/207 | 7,082,216 | B2 | 7/2006 | Jones et al. ................. 382/137 |
| 6,241,069 | B1 | 6/2001 | Mazur et al. ............... 194/207 | 7,092,560 | B2 | 8/2006 | Jones et al. ............... 382/135 |
| 6,256,407 | B1 | 7/2001 | Mennie et al. ............. 382/135 | 7,103,206 | B2 | 9/2006 | Graves et al. ............. 382/135 |
| 6,278,795 | B1 | 8/2001 | Anderson et al. ........... 382/135 | 7,103,438 | B2 | 9/2006 | Hallowell et al. ............ 700/116 |
| 6,282,523 | B1 | 8/2001 | Tedesco et al. | 7,124,113 | B1 * | 10/2006 | Fairclough et al. ............ 705/50 |
| 6,283,366 | B1 | 9/2001 | Hills et al. | 7,146,245 | B2 | 12/2006 | Jones et al. ................. 700/224 |
| 6,311,819 | B1 | 11/2001 | Stromme et al. ........... 194/207 | 7,149,336 | B2 | 12/2006 | Jones et al. ............... 382/135 |
| 6,318,537 | B1 | 11/2001 | Jones et al. ................. 194/346 | 7,158,662 | B2 | 1/2007 | Chiles |

| | | | | | | |
|---|---|---|---|---|---|---|
| 7,171,032 B2 | 1/2007 | Jones et al. ............... 382/135 | 2003/0062242 A1 | 4/2003 | Hallowell et al. ............ 194/302 |
| 7,187,795 B2 | 3/2007 | Jones et al. ............... 382/135 | 2003/0080032 A1 | 5/2003 | Heidel et al. |
| 7,191,657 B2 | 3/2007 | Maier et al. ................. 73/587 | 2003/0081824 A1 | 5/2003 | Mennie et al. ............... 382/135 |
| 7,197,173 B2 | 3/2007 | Jones et al. ............... 382/135 | 2003/0099379 A1 | 5/2003 | Monk et al. |
| 7,200,255 B2 | 4/2007 | Jones et al. ............... 382/135 | 2003/0108233 A1 | 6/2003 | Raterman et al. ........... 382/135 |
| 7,201,320 B2 | 4/2007 | Csulits et al. ........... 235/462.01 | 2003/0121752 A1 | 7/2003 | Stromme et al. ............ 194/207 |
| 7,216,106 B1 | 5/2007 | Buchanan et al. | 2003/0121753 A1 | 7/2003 | Stromme et al. ............ 194/207 |
| 7,232,024 B2 | 6/2007 | Mazur et al. ............... 194/207 | 2003/0132281 A1 | 7/2003 | Jones et al. ............... 235/379 |
| 7,243,773 B2 | 7/2007 | Bochonok et al. | 2003/0139994 A1 | 7/2003 | Jones ............................ 705/36 |
| 7,248,730 B2 | 7/2007 | Matsui et al. | 2003/0168308 A1 | 9/2003 | Maier et al. ................. 194/207 |
| 7,248,731 B2 | 7/2007 | Raterman et al. ........... 382/135 | 2003/0174874 A1 | 9/2003 | Raterman et al. ........... 382/135 |
| 7,256,874 B2 | 8/2007 | Csulits et al. ................. 356/71 | 2003/0182217 A1 | 9/2003 | Chiles ............................ 705/35 |
| 7,269,279 B2 | 9/2007 | Chiles | 2003/0198373 A1 | 10/2003 | Raterman et al. ........... 382/135 |
| 7,349,566 B2 | 3/2008 | Jones et al. ............... 382/139 | 2003/0202690 A1 | 10/2003 | Jones et al. ............... 382/139 |
| 7,362,891 B2 | 4/2008 | Jones et al. ............... 382/135 | 2004/0003980 A1 | 1/2004 | Hallowell et al. ............ 194/206 |
| 7,366,338 B2 | 4/2008 | Jones et al. ............... 382/135 | 2004/0016621 A1 | 1/2004 | Jenrick et al. ................ 194/206 |
| 7,391,897 B2 | 6/2008 | Jones et al. ............... 382/135 | 2004/0016797 A1 | 1/2004 | Jones et al. ............... 235/379 |
| 7,505,831 B2 | 3/2009 | Jones et al. ............... 700/224 | 2004/0028266 A1 | 2/2004 | Jones et al. ............... 382/135 |
| 7,536,046 B2 | 5/2009 | Raterman et al. ........... 382/135 | 2004/0083149 A1 | 4/2004 | Jones ............................ 705/35 |
| 7,542,598 B2 | 6/2009 | Jones et al. ............... 382/135 | 2004/0131230 A1 | 7/2004 | Paraskevakos |
| 7,551,764 B2 | 6/2009 | Chiles et al. ................ 382/135 | 2004/0145726 A1 | 7/2004 | Csulits et al. ................. 356/71 |
| 7,567,698 B2 | 7/2009 | Paraskevakos ............. 382/135 | 2004/0149538 A1 | 8/2004 | Sakowski ..................... 194/207 |
| 7,574,377 B2 | 8/2009 | Carapelli ........................ 705/26 | 2004/0153408 A1 | 8/2004 | Jones et al. ................... 705/43 |
| 7,590,274 B2 | 9/2009 | Raterman et al. ........... 382/135 | 2004/0154964 A1 | 8/2004 | Jones ............................ 209/534 |
| 7,591,428 B2 | 9/2009 | Freeman et al. ............ 235/449 | 2004/0173432 A1 | 9/2004 | Jones ............................ 194/216 |
| 7,599,543 B2 | 10/2009 | Jones et al. ............... 382/137 | 2004/0182675 A1 | 9/2004 | Long et al. ................... 194/206 |
| 7,600,626 B2 | 10/2009 | Hallowell et al. ............ 194/206 | 2004/0251110 A1 | 12/2004 | Jenrick et al. ................ 194/207 |
| 7,602,956 B2 | 10/2009 | Jones et al. ............... 382/135 | 2005/0029168 A1 | 2/2005 | Jones et al. ................... 209/534 |
| 7,619,721 B2 | 11/2009 | Jones et al. ................... 356/71 | 2005/0035034 A1 | 2/2005 | Long et al. ................... 209/534 |
| 7,620,231 B2 | 11/2009 | Jones et al. ............... 382/137 | 2005/0040225 A1 | 2/2005 | Csulits et al. ............... 235/379 |
| 6,381,354 C1 | 12/2009 | Mennie et al. ............... 382/135 | 2005/0047642 A1 | 3/2005 | Jones et al. ............... 382/137 |
| 7,628,326 B2 | 12/2009 | Freeman et al. ............ 235/450 | 2005/0060055 A1 | 3/2005 | Hallowell et al. ............ 700/95 |
| 7,635,082 B2 | 12/2009 | Jones ............................ 235/379 | 2005/0060059 A1 | 3/2005 | Klein et al. ................... 700/213 |
| 7,647,275 B2 | 1/2010 | Jones ............................ 705/40 | 2005/0060061 A1 | 3/2005 | Jones ............................ 700/226 |
| 7,650,980 B2 | 1/2010 | Jenrick et al. ................ 194/206 | 2005/0077142 A1 | 4/2005 | Tam et al. ..................... 194/217 |
| 7,672,499 B2 | 3/2010 | Raterman et al. ........... 382/135 | 2005/0086271 A1 | 4/2005 | Jones et al. ................... 707/200 |
| 7,686,151 B2 | 3/2010 | Renz et al. ................... 194/206 | 2005/0087422 A1 | 4/2005 | Maier et al. ................. 194/207 |
| 7,724,938 B2 | 5/2010 | Pareskevakos | 2005/0108165 A1 | 5/2005 | Jones et al. ................... 705/43 |
| 7,726,457 B2 | 6/2010 | Maier et al. ................. 194/206 | 2005/0117791 A2 | 6/2005 | Raterman et al. ........... 382/135 |
| 7,735,621 B2 | 6/2010 | Hallowell et al. ............ 194/206 | 2005/0117792 A2 | 6/2005 | Graves et al. ............... 382/135 |
| 7,753,189 B2 | 7/2010 | Maier et al. ................. 194/206 | 2005/0150738 A1 | 7/2005 | Hallowell et al. ............ 194/206 |
| 7,762,380 B2 | 7/2010 | Freeman et al. ............ 194/210 | 2005/0163361 A1 | 7/2005 | Jones et al. ............... 382/135 |
| 7,778,456 B2 | 8/2010 | Jones et al. ............... 382/135 | 2005/0163362 A1 | 7/2005 | Jones et al. ............... 382/137 |
| 7,779,982 B2 | 8/2010 | Fitzgerald et al. ........... 194/206 | 2005/0169511 A1 | 8/2005 | Jones ............................ 382/135 |
| 7,817,842 B2 | 10/2010 | Mennie ........................ 382/137 | 2005/0173221 A1 | 8/2005 | Maier et al. ................. 194/207 |
| 2001/0006557 A1 | 7/2001 | Mennie et al. ............... 382/135 | 2005/0183928 A1 | 8/2005 | Jones et al. ................... 194/207 |
| 2001/0015311 A1 | 8/2001 | Mennie ........................ 194/207 | 2005/0207634 A1 | 9/2005 | Jones et al. ............... 382/135 |
| 2001/0018739 A1 | 8/2001 | Anderson et al. | 2005/0213803 A1 | 9/2005 | Mennie ........................ 382/135 |
| 2001/0019624 A1 | 9/2001 | Raterman et al. ........... 382/135 | 2005/0241909 A1 | 11/2005 | Mazur et al. ............... 194/207 |
| 2001/0035603 A1 | 11/2001 | Graves et al. ........... 271/265.01 | 2005/0249394 A1 | 11/2005 | Jones et al. ............... 382/135 |
| 2001/0053241 A1 | 12/2001 | Haycock | 2005/0265591 A1 | 12/2005 | Jones et al. ............... 382/135 |
| 2002/0001393 A1 | 1/2002 | Jones et al. ............... 382/100 | 2005/0276458 A1 | 12/2005 | Jones et al. ............... 382/135 |
| 2002/0020603 A1 | 2/2002 | Jones et al. ............... 194/346 | 2005/0278239 A1 | 12/2005 | Jones et al. ................... 705/35 |
| 2002/0056605 A1 | 5/2002 | Mazur et al. ............... 194/207 | 2006/0010071 A1 | 1/2006 | Jones et al. ................... 705/42 |
| 2002/0082993 A1 | 6/2002 | Hoyos et al. | 2006/0054454 A1 | 3/2006 | Oh |
| 2002/0085245 A1 | 7/2002 | Mennie et al. ............... 358/498 | 2006/0078186 A1 | 4/2006 | Freeman et al. ............ 382/135 |
| 2002/0085745 A1 | 7/2002 | Jones et al. ............... 382/135 | 2006/0182330 A1 | 8/2006 | Chiles ............................ 382/135 |
| 2002/0103757 A1 | 8/2002 | Jones et al. ................... 705/45 | 2006/0195567 A1 | 8/2006 | Mody et al. ................... 709/224 |
| 2002/0104785 A1 | 8/2002 | Klein et al. ................... 209/534 | 2006/0210137 A1 | 9/2006 | Raterman et al. ........... 382/135 |
| 2002/0107801 A1 | 8/2002 | Jones et al. ................... 705/45 | 2006/0274929 A1 | 12/2006 | Jones et al. ............... 382/135 |
| 2002/0118871 A1 | 8/2002 | Jones et al. ............... 382/137 | 2007/0071302 A1 | 3/2007 | Jones et al. ............... 382/135 |
| 2002/0122580 A1 | 9/2002 | Jones et al. ............... 382/135 | 2007/0076939 A1 | 4/2007 | Jones et al. ............... 382/135 |
| 2002/0126885 A1 | 9/2002 | Mennie et al. ............... 382/135 | 2007/0078560 A1 | 4/2007 | Jones et al. ............... 700/224 |
| 2002/0126886 A1 | 9/2002 | Jones et al. ............... 382/135 | 2007/0095630 A1 | 5/2007 | Mennie et al. ............... 194/206 |
| 2002/0131630 A1 | 9/2002 | Jones et al. ............... 382/137 | 2007/0112674 A1 | 5/2007 | Jones et al. ................... 705/45 |
| 2002/0136442 A1 | 9/2002 | Jones et al. ............... 382/135 | 2007/0122023 A1 | 5/2007 | Jenrick et al. ................ 382/135 |
| 2002/0145035 A1 | 10/2002 | Jones ............................ 235/379 | 2007/0172106 A1 | 7/2007 | Paraskevakos ............. 382/135 |
| 2002/0154804 A1 | 10/2002 | Jones et al. ............... 382/135 | 2007/0172107 A1 | 7/2007 | Jones et al. ............... 382/137 |
| 2002/0154805 A1 | 10/2002 | Jones et al. ............... 382/135 | 2007/0209904 A1 | 9/2007 | Freeman et al. ............ 194/210 |
| 2002/0154806 A1 | 10/2002 | Jones et al. ............... 382/135 | 2007/0221470 A1 | 9/2007 | Mennie et al. ............... 194/216 |
| 2002/0154807 A1 | 10/2002 | Jones et al. ............... 382/135 | 2007/0237381 A1 | 10/2007 | Mennie et al. ............... 382/135 |
| 2002/0154808 A1 | 10/2002 | Jones et al. ............... 382/135 | 2007/0258633 A1 | 11/2007 | Jones et al. ............... 382/135 |
| 2002/0186876 A1 | 12/2002 | Jones et al. ............... 382/135 | 2007/0269097 A1 | 11/2007 | Chiles et al. ................ 382/135 |
| 2003/0006277 A1 | 1/2003 | Maskatiya et al. | 2007/0278064 A1 | 12/2007 | Hallowell et al. ............ 194/206 |
| 2003/0009420 A1 | 1/2003 | Jones ............................ 705/39 | 2008/0006505 A1 | 1/2008 | Renz et al. ................... 194/206 |
| 2003/0015395 A1 | 1/2003 | Hallowell et al. ............ 194/206 | 2008/0033829 A1 | 2/2008 | Mennie et al. ................. 705/16 |
| 2003/0015396 A1 | 1/2003 | Mennie ........................ 194/206 | 2008/0037856 A1 | 2/2008 | Paraskevakos ............. 382/140 |
| 2003/0023557 A1 | 1/2003 | Moore ............................ 705/50 | 2008/0044077 A1 | 2/2008 | Mennie et al. ............... 382/135 |
| 2003/0059098 A1 | 3/2003 | Jones et al. ............... 382/135 | 2008/0060906 A1 | 3/2008 | Fitzgerald et al. ........... 194/207 |

| | | | | | | |
|---|---|---|---|---|---|---|
| 2008/0123932 A1 | 5/2008 | Jones et al. ............... 382/135 | | GB | 2 204 166 A | 11/1988 |
| 2008/0133411 A1 | 6/2008 | Jones et al. ................ 705/42 | | GB | 2 272 762 A | 5/1994 |
| 2008/0177420 A1 | 7/2008 | Klein et al. ............... 700/224 | | GB | 2 355 522 A | 4/2001 |
| 2008/0219543 A1 | 9/2008 | Csulits et al. ............. 382/135 | | GB | 2 464 826 A | 5/2010 |
| 2008/0285838 A1 | 11/2008 | Jones et al. .............. 382/135 | | JP | 62-220843 A | 9/1987 |
| 2009/0001661 A1 | 1/2009 | Klein et al. .............. 271/258.01 | | JP | 63-073497 A | 4/1988 |
| 2009/0013653 A1 | 1/2009 | Sekiguchi | | JP | 02-012492 A | 1/1990 |
| 2009/0022390 A1 | 1/2009 | Yacoubian et al. ........ 382/135 | | JP | 04-131986 A | 5/1992 |
| 2009/0087076 A1 | 4/2009 | Jenrick ..................... 382/135 | | JP | 04-243497 A | 8/1992 |
| 2009/0090779 A1 | 4/2009 | Freeman ................... 235/450 | | JP | 06-203248 A | 7/1994 |
| 2009/0148027 A1 | 6/2009 | Paraskevakos | | JP | 07-168857 A | 7/1995 |
| 2009/0183967 A1 | 7/2009 | Hamasaki | | WO | WO 85/02148 A1 | 5/1985 |
| 2009/0236200 A1 | 9/2009 | Hallowell et al. | | WO | WO 87/06041 A1 | 10/1987 |
| 2009/0310188 A1 | 12/2009 | Jones et al. ............... 358/448 | | WO | WO 90/07165 A1 | 6/1990 |
| 2009/0313159 A1 | 12/2009 | Jones et al. ................ 705/35 | | WO | WO 91/11778 A1 | 8/1991 |
| 2010/0034454 A1 | 2/2010 | Jones et al. ............... 382/137 | | WO | WO 92/04692 | 3/1992 |
| 2010/0051687 A1 | 3/2010 | Jones et al. ............... 235/379 | | WO | WO 92/14221 A1 | 8/1992 |
| 2010/0057617 A1 | 3/2010 | Jones et al. ................ 705/44 | | WO | WO 92/16931 A2 | 10/1992 |
| 2010/0063916 A1 | 3/2010 | Jones et al. ................ 705/35 | | WO | WO 92/17394 A1 | 10/1992 |
| 2010/0092065 A1 | 4/2010 | Jones et al. ............... 382/135 | | WO | WO 93/23824 A1 | 11/1993 |
| 2010/0108463 A1 | 5/2010 | Renz et al. ................ 194/206 | | WO | WO 94/06102 A1 | 3/1994 |
| 2010/0116619 A1 | 5/2010 | Jones ........................ 194/217 | | WO | WO 94/16412 A1 | 7/1994 |
| 2010/0163366 A1 | 7/2010 | Jenrick et al. ............. 194/206 | | WO | WO 94/19773 A1 | 9/1994 |
| 2010/0236892 A1 | 9/2010 | Jones et al. ............... 194/206 | | WO | WO 95/10088 A1 | 4/1995 |
| 2010/0263984 A1 | 10/2010 | Freeman et al. .......... 194/206 | | WO | WO 95/19019 A2 | 7/1995 |
| 2010/0276485 A1 | 11/2010 | Jones et al. ............... 235/379 | | WO | WO 95/24691 A1 | 9/1995 |
| 2010/0303111 A1 | 12/2010 | Kupershmidt ............... 372/32 | | WO | WO 96/03719 A1 | 2/1996 |
| | | | | WO | WO 96/10800 A1 | 4/1996 |
| FOREIGN PATENT DOCUMENTS | | | | WO | WO 96/29683 A1 | 9/1996 |
| CA | 2 684 159 A1 | 4/2010 | | WO | WO 96/36021 A1 | 11/1996 |
| DE | 28 24 849 A1 | 12/1979 | | WO | WO 96/36933 A1 | 11/1996 |
| EP | 0 030 413 A1 | 6/1981 | | WO | WO 97/05583 A1 | 2/1997 |
| EP | 0 071 421 A2 | 2/1983 | | WO | WO 97/29459 A1 | 8/1997 |
| EP | 0 077 464 A2 | 4/1983 | | WO | WO 97/30422 A1 | 8/1997 |
| EP | 0 083 062 A2 | 7/1983 | | WO | WO 97/43734 A1 | 11/1997 |
| EP | 0 101 115 A1 | 2/1984 | | WO | WO 97/45810 A1 | 12/1997 |
| EP | 0 109 743 A2 | 5/1984 | | WO | WO 98/12662 A1 | 3/1998 |
| EP | 0 185 200 A2 | 6/1986 | | WO | WO 98/13785 A1 | 4/1998 |
| EP | 0 253 935 A2 | 1/1988 | | WO | WO 98/24041 A1 | 6/1998 |
| EP | 0 314 312 A2 | 5/1989 | | WO | WO 98/24052 A1 | 6/1998 |
| EP | 0 325 364 A2 | 7/1989 | | WO | WO 98/24067 A1 | 6/1998 |
| EP | 0 338 123 A2 | 10/1989 | | WO | WO 98/26364 A1 | 6/1998 |
| EP | 0 342 647 A2 | 11/1989 | | WO | WO 98/35323 A2 | 8/1998 |
| EP | 0 402 627 A1 | 12/1990 | | WO | WO 98/40839 A2 | 9/1998 |
| EP | 0 416 916 A2 | 3/1991 | | WO | WO 98/47100 A1 | 10/1998 |
| EP | 0 416 960 A1 | 3/1991 | | WO | WO 98/50892 A1 | 11/1998 |
| EP | 0 473 106 A2 | 3/1992 | | WO | WO 98/51082 A1 | 11/1998 |
| EP | 0 548 142 A1 | 6/1993 | | WO | WO 99/00776 A1 | 1/1999 |
| EP | 0 578 875 A1 | 1/1994 | | WO | WO 99/09511 A1 | 2/1999 |
| EP | 0 583 526 A1 | 2/1994 | | WO | WO 99/14668 A1 | 3/1999 |
| EP | 0 583 723 A1 | 2/1994 | | WO | WO 99/23601 A1 | 5/1999 |
| EP | 0 593 209 A2 | 4/1994 | | WO | WO 99/41695 A1 | 8/1999 |
| EP | 0 612 042 A2 | 8/1994 | | WO | WO 99/48040 A1 | 9/1999 |
| EP | 0 613 107 A1 | 8/1994 | | WO | WO 99/48042 A1 | 9/1999 |
| EP | 0 616 296 A2 | 9/1994 | | WO | WO 99/50795 A1 | 10/1999 |
| EP | 0 686 292 A1 | 9/1994 | | WO | WO 99/50796 A1 | 10/1999 |
| EP | 0 632 415 A1 | 1/1995 | | WO | WO 00/24572 A1 | 5/2000 |
| EP | 0 633 533 A2 | 1/1995 | | WO | WO 00/58876 A1 | 10/2000 |
| EP | 0 633 552 A2 | 1/1995 | | WO | WO 00/65546 A1 | 11/2000 |
| EP | 0 633 553 A1 | 1/1995 | | WO | WO 01/08108 A2 | 2/2001 |
| EP | 0 661 654 A2 | 7/1995 | | WO | WO 01/59685 A2 | 8/2001 |
| EP | 0 671 696 A1 | 9/1995 | | WO | WO 01/59723 A1 | 8/2001 |
| EP | 0 718 809 A2 | 6/1996 | | WO | WO 02/29735 A2 | 4/2002 |
| EP | 0 760 987 A1 | 9/1996 | | WO | WO 02/054360 A2 | 7/2002 |
| EP | 0 824 736 A1 | 11/1996 | | WO | WO 03/005312 A1 | 1/2003 |
| EP | 1 004 089 A1 | 6/1998 | | WO | WO 03/028361 A2 | 4/2003 |
| EP | 0 708 419 A1 | 1/2000 | | WO | WO 03/029913 A2 | 4/2003 |
| EP | 0 984 410 A1 | 3/2000 | | WO | WO 03/030113 A1 | 4/2003 |
| EP | 1 028 359 A1 | 8/2000 | | WO | WO 03/067532 A1 | 8/2003 |
| EP | 1 041 523 A2 | 10/2000 | | WO | WO 03/107282 A2 | 12/2003 |
| EP | 1 134 704 A1 | 9/2001 | | WO | WO 2004/010367 A1 | 1/2004 |
| EP | 1 160 737 A1 | 12/2001 | | WO | WO 2004/027717 A2 | 4/2004 |
| EP | 1 019 869 A1 | 10/2006 | | WO | WO 2004/036508 A2 | 4/2004 |
| EP | 1 480 177 B1 | 11/2007 | | WO | WO 2004/038631 A2 | 5/2004 |
| EP | 1 008 096 A2 | 1/2008 | | WO | WO 2004/068422 A1 | 8/2004 |
| FR | 2 539 898 A1 | 7/1984 | | WO | WO 2005/013209 A2 | 2/2005 |
| FR | 2 722 316 A1 | 1/1996 | | WO | WO 2005/017842 A1 | 2/2005 |
| GB | 2 038 063 A | 7/1980 | | WO | WO 2005/028348 A2 | 3/2005 |
| GB | 2 190 996 A | 12/1987 | | WO | WO 2005/029240 A2 | 3/2005 |

| | | | |
|---|---|---|---|
| WO | WO 2005/036445 A1 | 4/2005 |
| WO | WO 2005/041134 A2 | 5/2005 |
| WO | WO 2005/076229 A1 | 8/2005 |
| WO | WO 2006/039439 A2 | 4/2006 |
| WO | WO 2006/076289 A2 | 7/2006 |
| WO | WO 2006/076634 A2 | 7/2006 |
| WO | WO 2007/044570 A2 | 4/2007 |
| WO | WO 2007/120825 A2 | 10/2007 |
| WO | WO 2007/143128 A2 | 12/2007 |
| WO | WO 2008/030356 A1 | 3/2008 |
| WO | WO 2008/112132 A1 | 9/2008 |

OTHER PUBLICATIONS

NCR: NCR 5685 ATM Deposit Processing Module, Dialog Web, "NCR's ATM Captures Images at the Point of Deposit. (NCR Corp.'s New Automated Teller Machine)", Financial Services Report, vol. 10, No. 2, p. 8(1), 2 pages (Jan. 20, 1993).
Document Solutions Inc.: Image Solution, DialogWeb, "Bank Gets Big Response to Image Statements", Electronic Imaging Report, vol. 2, No. 9, 3 pages (May 6, 1992 ).
Vector: Miscellaneous meeting notes and communications between Cummins Allison Corp. and Vector Co. Ltd regarding Vector imager, 65 pages (Apr. 1, 1996 to Jun. 15, 1997).
Vector Tech.: Document Imaging Product Demonstration video on CD in .wmv format (Jun. 1996).
Applied Communications Inc.: BASE24 software, "Applied Communications Announces Joint Venture," Business Wire, 4 pages (Jan. 6, 1989).
AFB: AFB Currency Recognition System, 1 page (1982).
ASCOM: Cashflow Emerald, 2 pages, (date unknown).
ATM Cardpay Corp: "ATM Cardpay Introduces New Bill Payment Idea," Retail Delivery Systems News, vol. 3, Iss. 1, p. 1; 2 pages (Jan. 16, 1998).
ATM Cardpay Corp: "'The Next Generation of ATM Network Survival.' ATM Cardpay Shows Switches How to Win Bill Presentment/Payments Market," EFT Report, vol. 20, Iss. 17, p. 1; 3 pages (Aug. 27, 1997).
AUI: Coinverter—"No More Lines . . . Self-Serve Cash-Out," by Cassius Elston, 1995 World Games Congress/Exposition Converter, 1 page (dated prior to 1995).
Barton, Louis L., "Check Processing Operations"—A Hands-On Guide to Developing and Managing a State-of-the-Art Check Processing Operation, Chp. 8 and App. 2, 31 pages (1994).
Brandt: Mach 7 High-Speed Coin Sorter/Counter, 2 pages (1992).
Brandt: Model 8904 Upfeed—"High Speed 4-Denomination Currency Dispenser," 2 pages (1989).
Cummins: JetScan™ Model 4060, Currency Scanner/Counter, Operator's Manual, 43 pages (Aug. 1991).
Cummins: JetScan™ Model 4060, Sale of JetScan Currency Scanner/Counter, 1 pages (Aug. 1991).
Cummins: JetScan™ Model 4061, Currency Scanner/Counter—Operating Instructions, 47 pages (Apr. 20, 1993).
Cummins: JetScan™ Model 4061, Sale of JetScan Currency Scanner/Counter, 1 page (Apr. 20, 1993).
Cummins: JetScan™ Model 4062, Currency Scanner/Counter—Operating Instructions (022-7120-00), 53 pages (Nov. 28, 1994).
Cummins: JetScan™ Model 4062, Sale of JetScan Currency Scanner/Counter, Model 4062, 1 page (Nov. 28, 1994).
Cummins: JetSort® High Speed Sorter/Counter Kits I & J—Operating Instructions (Form 022-7123-00) 12 pages (1994).
Currency Systems International: Mr. W. Kranister in Conversation with Richard Haycock, 5 pages (estimated 1994).
Currency Systems International: CPS 300 Currency Processing System, 4 pages (© 1992).
Currency Systems International: CPS 600/900, Medium Speed Currency Sorting Family, CPS 600 and CPS 900, 4 pages (© 1994).
Currency Systems International: CPS 600/900, Description of CSI CPS 600 and CPS 900 devices, 1 page (date: estimated 1994).
De La Rue: CDS 5700 and CDS 5800 Cash Deponier System (German) and translation, 7 pages (date unknown).
EP App. No. 04 020 193.1 [claiming priority to U.S. Appl. No. 60/043,516], European Patent Office, Communication pursuant to Article 96(2), Discussion of FR 2 722 316, 4 pages (Jul. 18, 2005).
Elcom International Inc: PECOS Internet Procurement Manager, "Elcom.com and Visa Announce Systems Link to Offer B2B Ecommerce Solutions," PRNewswire, 4 pages (Nov. 29, 1999).
Glory: CRS-8000 Cash Redemption System, 2 pages (1996).
Glory: GFB-200/210/220/230 DeskTop Bank Note Counter brochure, 2 pages (estimated before Aug. 9, 1994).
Glory: GSA-500 Sortmaster brochure, 2 pages (estimated Jan. 14, 1994).
Glory: System 8000 Recycle Currency Processing Teller System, p. 5 of General Catalogue of Glory Products, 2 pages (1995).
Glory: UF-1D brochure and translation, 2 pages (estimated before Aug. 9, 1994).
ISH Electronic: ISH I2005/500 Coin Counter (with translation), 4 pages (date unknown, prior to Aug. 1996).
ISH Electronic: ISH I2005/501 Self-Service Unit (with translation), 4 pages (date unknown, prior to Aug. 1996).
J&B Software Inc.: TMS Image, "J&B Software Announces New Successes for TMS Image™ Remittance," PRNewswire, 2 pages (Mar. 23, 1998).
NGZ Geldzahlmaschinengesellschaft: NGZ 2100 Automated Coin Depository, 4 pages (date unknown).
Perconta: Cassomat A.C.S. Automated Cash System Types I and II, 6 pages (1998).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6501/CRS 6510 Cash Receipt Systems for Self-Service Area, 3 pages (date unknown, prior to Apr. 2003).
Scan Coin: CDS 600 Cash Deposit System, 2 pages (date unknown, maybe 1994).
Scan Coin: CDS 640 Cash Deposit System, "With Scan Coin's customer operated coin deposit system . . . ," 2 pages (date unknown, prior to Apr. 2003).
ShieldSpec LLC: Currency Manager for Law Enforcement, 1 page (downloaded from www.shieldspec.com/product.html on Aug. 18, 2010).
ShieldSpec LLC: Presentation on Currency Manager for Law Enforcement, 10 pages (downloaded from www.shieldspec.com/documents/CurrencyManagerLawEnforcement.pdf on Aug. 18, 2010), © 2005.
Toshiba/(Mosler): CF-400 Series Fitness Sorter, 6 pages (estimated 1989 or earlier).
(Toshiba)/Mosler: CF-420 Cash Management System—Operator's Manual, 137 pages (© 1989).
Toshiba/Mosler: CF-420—Description of Toshiba/Mosler CF-420 Device, 1 page (date estimated 1989).
Toshiba/Mosler: CF-420—Revised drawings of portions of Mosler CF-420 Cash Management System (Figs. A-C) and description of the same, 4 pages (1989).

* cited by examiner

AUTOMATED PAYMENT SYSTEM AND METHOD

CROSS REFERENCE TO RELATED APPLICATIONS

This application is a continuation of U.S. patent application Ser. No. 11/649,394, filed Jan. 3, 2007, now issued as U.S. Pat. No. 7,882,000, which is a divisional of U.S. patent application Ser. No. 09/899,727, filed Jul. 5, 2001 now issued as U.S. Pat. No. 7,647,275, each of which are hereby incorporated by reference herein in their entirety.

BACKGROUND OF THE INVENTION

Currently, when a customer receives an invoice from a company, a check is usually written for the invoice and then sent in the mail with the payment stub or invoice. Often, these payments go to a post office box number. These post office box numbers are often located at a bank and are commonly known as "lock boxes." Bank personnel receive the payments, deposit the checks into the company's account, and forward the invoices to the company for reconciliation purposes. The check is then routed through the Federal Reserve Bank system to the bank of the customer. This whole process can take up to a week or more before the customer's account at the company is credited. Such a long processing time can cause the customer to be charged with late fees and/or interest on the unpaid amount. Also, the long processing time may adversely affect the company, as it is dependent on the mail to receive payments to its account. Also, the company has to deal with angry customers who demand that late charges and interest fees be reversed.

Some banks provide invoice payment services for customers who travel frequently. The bills are forwarded directly to the bank, and an employee of the bank writes the check or debits the customer's account for the payment. Because the customer's bank may not be the bank of the company, however, the bills still need to be mailed to the lock box for processing.

Another method recently instituted by some banks and companies is payment via the internet. Such systems vary, but there are two main methods. In one method, a customer enters the company's website and selects a payment option. The customer may then enter important data such as name, address, e-mail address, and the account number they wish to have credited. Also, the customer must provide authorization for the transaction to occur and supply information regarding from where the payment should be debited, i.e., bank name and routing number and account name and number.

After the program is established, the user may pay bills on-line. This method takes time (up to three or four days), however, because the company must first send a request to the customer's bank and then wait for the bank to send the funds and for the receiving bank to process the transfer of funds.

The other method of paying on-line is utilized by the customer accessing his or her bank account and sending the information that way. In this system, the bank of the customer processes the transaction on-line and electronically transfers the funds to the company. This process is usually faster because the customer's bank is immediately sending the funds instead of waiting for a request from the company. This method also, however, has drawbacks. First, not all people have access to the internet. Although many people have computers, large segments of the population do not or do not know how to use the internet. Second, due to security issues, not all people who have access to the internet feel comfortable accessing accounts on-line. Some people do not want to provide account numbers on the internet for fear of hackers obtaining such information.

Also, the customer must still wait until they receive the invoice and must enter in the information every month.

Another drawback of current payment systems is that customers may only use them to pay companies that are on the internet and are established to receive payments in such a manner. For many smaller companies and individuals, the above-mentioned devices cannot be used.

In view of these problems, there is a need for a system which provides a customer with a method of faster payment of bills while ensuring the confidentiality of account numbers and the like. There is also a need for a method of payment where the customer does not need to enter payment information every month.

SUMMARY OF THE INVENTION

In an embodiment, a system for processing original checks comprises: a document scanning system having: an input receptacle for receiving an original check; and at least one image scanner for scanning both sides of the original check, wherein the at least one image scanner obtains images of both sides of the original check; a first computer communicatively coupled to the document scanning system, the first computer electronically transmitting the images of both sides of the original check over a communications link; and a second computer which receives the electronically transmitted images of both sides of the original check and prints a substitute check from the received images of both sides of the original check.

In another embodiment, a method for processing original checks comprises: scanning both sides of an original check to obtain images of both sides of the original check; receiving the images of both sides of the original check at a first computer; electronically transmitting the images of both sides of the original check from the first computer over a communications link; and receiving the electronically transmitted images of both sides of the original check at a second computer and printing a substitute check from the received images of both sides of the original check.

In another embodiment, a financial institution document processing network comprises: a document scanning system including a plurality of image scanners each operating to receive original checks and image both sides of the received original checks; and a computer communicatively coupled to the document scanning system, the computer operating to print substitute checks from the images of both sides of the original checks.

In another embodiment, a system for check processing checks comprises: at least one image processing unit comprising: an input receptacle for receiving an original check; an image scanner for scanning both sides of the original check to obtain images of both sides of the original check; and an interface to electronically transmit the images of both sides of the original check; and an account processing system that receives the electronically transmitted images, updates an account associated with the imaged original check and prints a substitute check from the images of both sides of the original check.

In another embodiment, a method for processing checks comprises: scanning both sides of an original check to create an electronic image of both sides of the original check; electronically transmitting the electronic image of both sides of the original check to a second location remote from the first location; printing a substitute check from the electronic image of both sides of the original check; and reconciling at least one account based on information contained in the scanned original check.

In another embodiment, a system comprises: a first processing system receiving an electronic image of an original check and reconciling a first account based on information contained in the original check image; a printer for printing a substitute check from the electronic image of the original check; and a second processing system receiving the electronic image of the original check from the first processing system and reconciling a second account based on information contained in the original check image.

In another embodiment, a method for processing checks electronically comprises: receiving, at a first bank location, an electronic image of both sides of an original check; determining whether to print a substitute check from the at least one electronic image at the first bank location; determining whether to forward the electronic image of both sides of the original check to a second bank location; and printing the substitute check at the second bank location.

BRIEF DESCRIPTION OF THE DRAWINGS

The foregoing and other advantages of the invention will become apparent upon reading the following detailed description and upon reference to the drawings.

Figure 1:
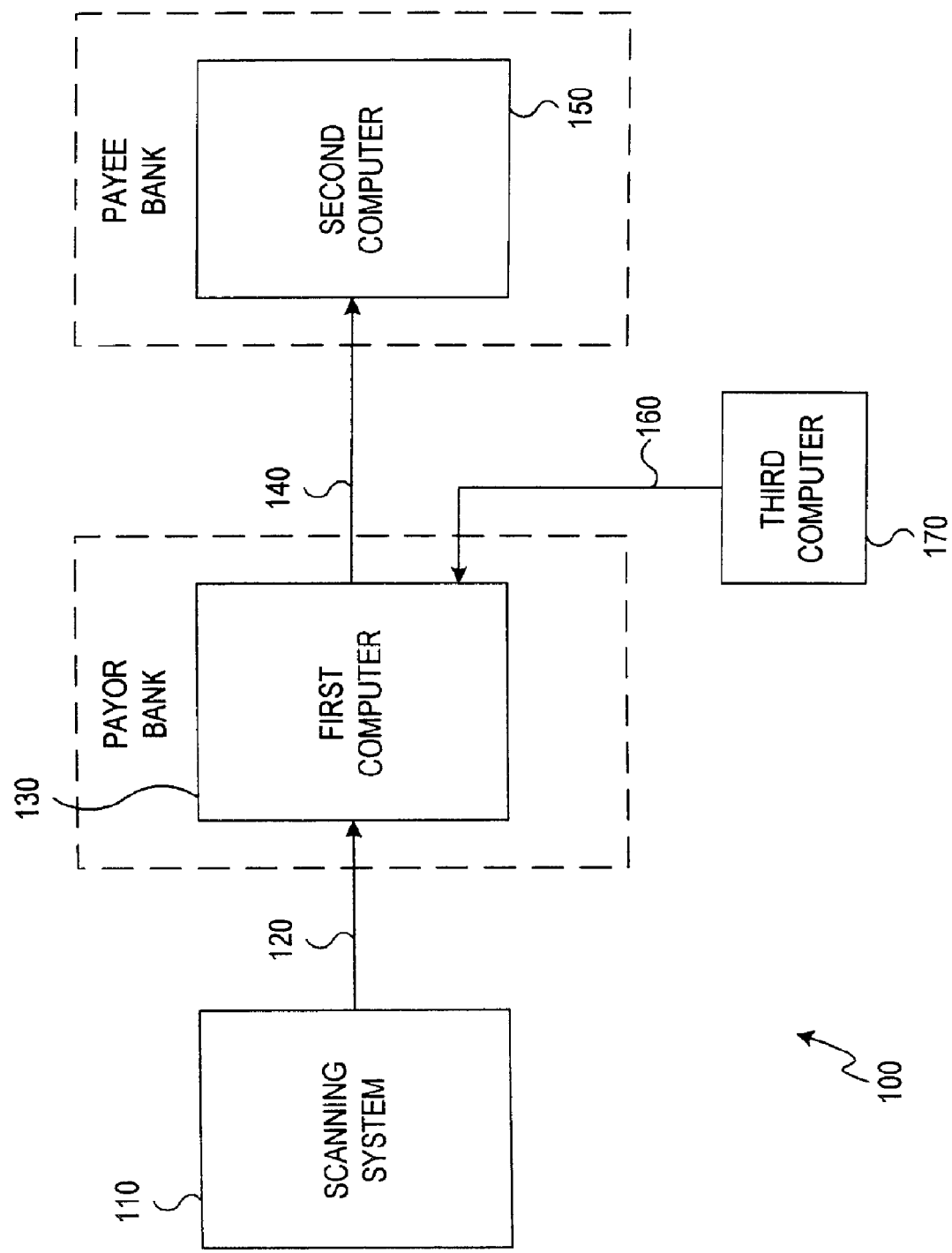
FIG. 1 is a block diagram of the components of an automated payment system according to principles of an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Customers write out and mail numerous checks in a month. These checks are written to payees for any number of reasons. The check may be to a company to pay a bill or invoice, or it may be written to a person as a gift. The term "customers" refers to any person or business that receives invoices requesting payment from anyone, a person or an entity. The term "payee" refers to whom the money is owed or to whom it is being paid. The term "payee," as used in this application, refers to any person or business who provides services and/or goods to a customer or to anyone to whom a customer wishes to pay money (i.e., a grandchild for a birthday present). The payee may send an invoice to the customer for payment. The term "invoice" refers to any sort of bill, payment coupon, remittance, or reminder notice of payment due for goods or services rendered. As described above in the background, this method of paying invoices often takes a great amount of time and is inefficient. In one embodiment of the present invention, the invoices or bills are mailed directly to a payment center for processing. The term "payment center" includes banks, savings and loans, investment houses, and all other types of financial institutions, whether private, public, or government, as well as including any other business that would provide this service, such as a currency exchange, department or other retail store, or places that normally accept bill payments. For ease of description, the following embodiments will be described in terms of banks, but it is understood that all other payment centers are contemplated.

Turning now to FIG. 1, a block diagram of an automated payment system 100 of the present invention is illustrated. The automated payment system 100 includes a document scanning system 110, which is capable of receiving documents. The term "documents" includes currency bills, financial institution documents, and other documents with predetermined fields. The term "currency bills" includes not only U.S. and foreign currency, but also currency created by corporations such as casino script and "Disney Dollars." The term "financial institution documents" includes checks, deposit slips, loan payment documents, cash tickets, savings withdrawal tickets, check deposit slips, savings deposit slips, and all other documents utilized as a proof of deposit at financial institutions. The term "documents" may also include invoices and other reminders received from companies requesting payment (such as collection notices and e-mail reminders).

In FIG. 1, the document scanning system 110 scans the documents and obtains images of the documents. The document scanning system is connected via a first communication link 120 to a first computer 130. The first communication link 120 is adapted to transmit information, such as the images, between the scanning system 110 and the first computer 130. The first communication link 120 may be any link used for data, voice, or video communications that is known in the art, such as a telephone line. Alternatively, the first communication link 120 may be over another form of media, such as a radio or microwave link.

The first computer 130 is a computer at a bank where the payor, or person receiving the invoice, has an account. The first computer 130 is adapted to receive information through the first communication link 120 and to update the payor's account accordingly (i.e., credit or debit the account). The first computer 130 may be located in the same place as the document scanning system 110, or it may be in a location remote, or separate, from the document scanning system 110. For example, it is contemplated that the document scanning system 110 and the first computer 130 may be located in the same building. It is also contemplated that the document scanning system 110 may be located at a branch of the payor bank, while the first computer 130 is located at the main office or processing center of the payor bank.

The first computer 130 of the payor bank is then linked via a second communication link 140, which is defined the same as above, to a second computer 150 at a payee bank. The payee bank is a bank having an account owned by the payee. The second communication link 140 allows the payor bank to communicate with the payee bank. In this embodiment, images obtained from the scanning system 110 may be transferred to the first computer 130 for debiting the customer's account and then transferred to the second computer 150 for crediting the payee's account. The images are transferred over the communication lines 120, 140. These transfers may occur substantially immediately. For example, an image that is scanned on a Monday morning may be electronically transferred to the receiving bank that day for crediting to the company's account within minutes. Alternatively, the transaction may occur within a couple of hours, depending on the speed of transmission and auditing requirements. In other embodiments, the payee and payor banks may have predetermined time periods established for the transfer of images. For example, the payor bank may send image transmissions once every hour, once a shift, or once a certain number of images have been obtained.

In another embodiment, the first computer 130 is linked via a communication line 160, as defined above, to a third computer 170 operated by the customer or payee. Information may be forwarded from the payor bank to the customer or payee. For example, images from the scanning system may be e-mailed to either the customer or the payee. In another embodiment, the images may not be transmitted, but a receipt indicating that the transaction occurred may be e-mailed. In another embodiment, the images may be downloaded onto a disk or a tape by either the payee or payor bank and forwarded to the customer or payee in this manner, as well. In this embodiment, the automated payment system 100 is useful because it provides the company, customer, or both with a detailed record of the transaction soon after the transaction occurs. If the image is sent to the company, the company may update their records faster than if the receipts were merely mailed to them.

In other embodiments, the third computer is operated by the customer and a fourth computer operated by the payee is included. Also, the third and fourth computers 170 may be linked to the second computer 150 instead of or in addition to the first computer 130. In all of these embodiments, the operation of the system is the same.

Figure 2:
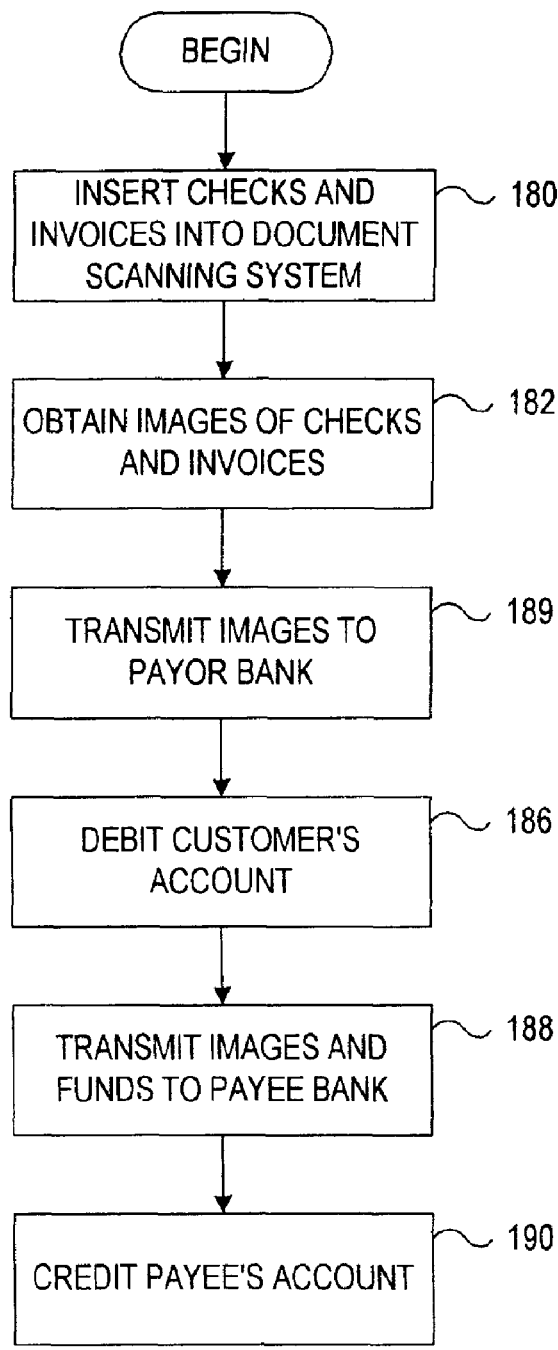
FIG. 2 is a flowchart describing the operation of an automated payment system according to principles of another embodiment of the present invention.

Turning now to FIG. 2, a brief description of how the embodiment described above operates will be described. First, at step 180, a check drawn on an account owned by a customer and an invoice are inserted into the scanning system. The check and invoice may be inserted as part of a stack or singularly. Images of the check and invoice are then obtained by the scanning system (step 182). Next, at step 184, the images are transmitted to a payor bank which holds the account owned by the customer. At step 186, the customer's account is then debited for the amount of the check. The images of the check and invoice, along with the funds debited from the customer's account, are transmitted at step 188 to a payee bank. The payee bank holds an account belonging to a payee listed on the check. Then, at step 190, the payee bank credits the payee's account with the funds received from the payor bank.

Figure 3:
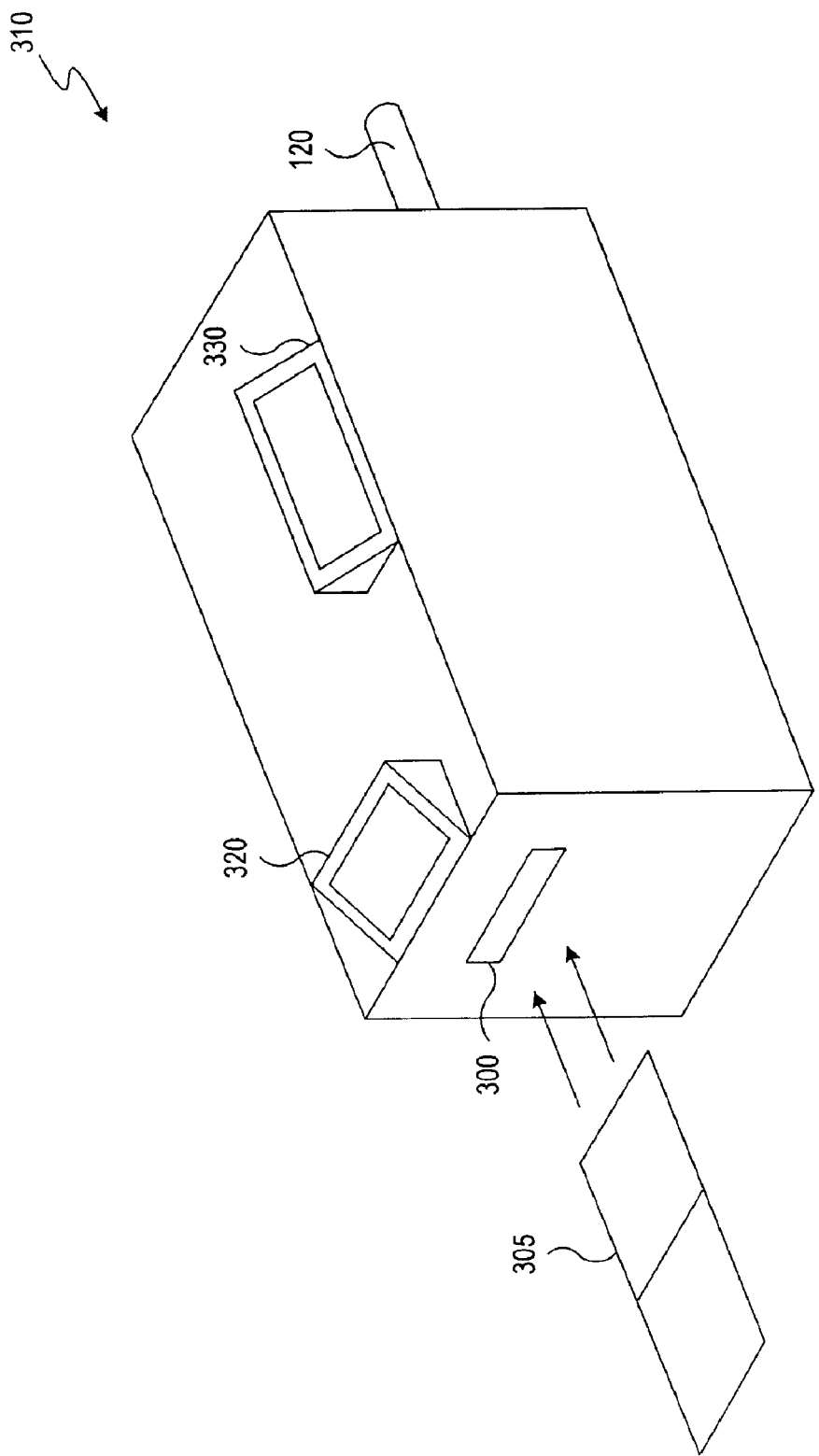
FIG. 3 is a perspective view of a document scanning system according to principles of an embodiment of the present invention.

Turning now to FIG. 3, a perspective view of one embodiment of a document scanning system 310 is depicted. The scanning system includes an input receptacle 300 adapted to receive a document 305. Information concerning the transaction may be communicated to an operator via an operator control panel 320, such as a display, a touch screen, or a video screen. The operator is a person employed or contracted by the bank to run the scanning system 310. The operator control panel 320 can be a touch screen which can be used by the operator to communicate interactively with the first computer 130 (FIG. 1). For example, the operator control panel 320 can also be a communicational video screen which displays video images of the document 305 as the document 305 is scanned. The operator control panel 320 may then prompt the operator to perform the next step, e.g., accept, reject, retry.

In the embodiment described above, there are situations when the customer is present as the operator scans the document 305. In such an embodiment, a customer control panel 330 may be provided to display information to a customer. The customer control panel 330 may also be a display, a video screen, or a touch screen as described above. In one embodiment, the customer control panel 330 includes a touch screen button for authorizing the transaction. Also, there may be a separate "OK" button. In other embodiments, the control panels 320, 330 may also have numeric keypads, standard keyboards, and/or denomination keys for inputting information into the document scanning system 310. For example, if a document has information that is unable to be scanned or if the information scanned is unreadable and/or unable to be deciphered, the control panels 320, 330 may be used to input the missing information into the scanning system 310. In an alternative embodiment, the control panels 320, 330 also include electronic signature pads and pens. The electronic signature pads and pens also enable operators and users to input information into the scanning system 310 if it is needed.

Figure 4:
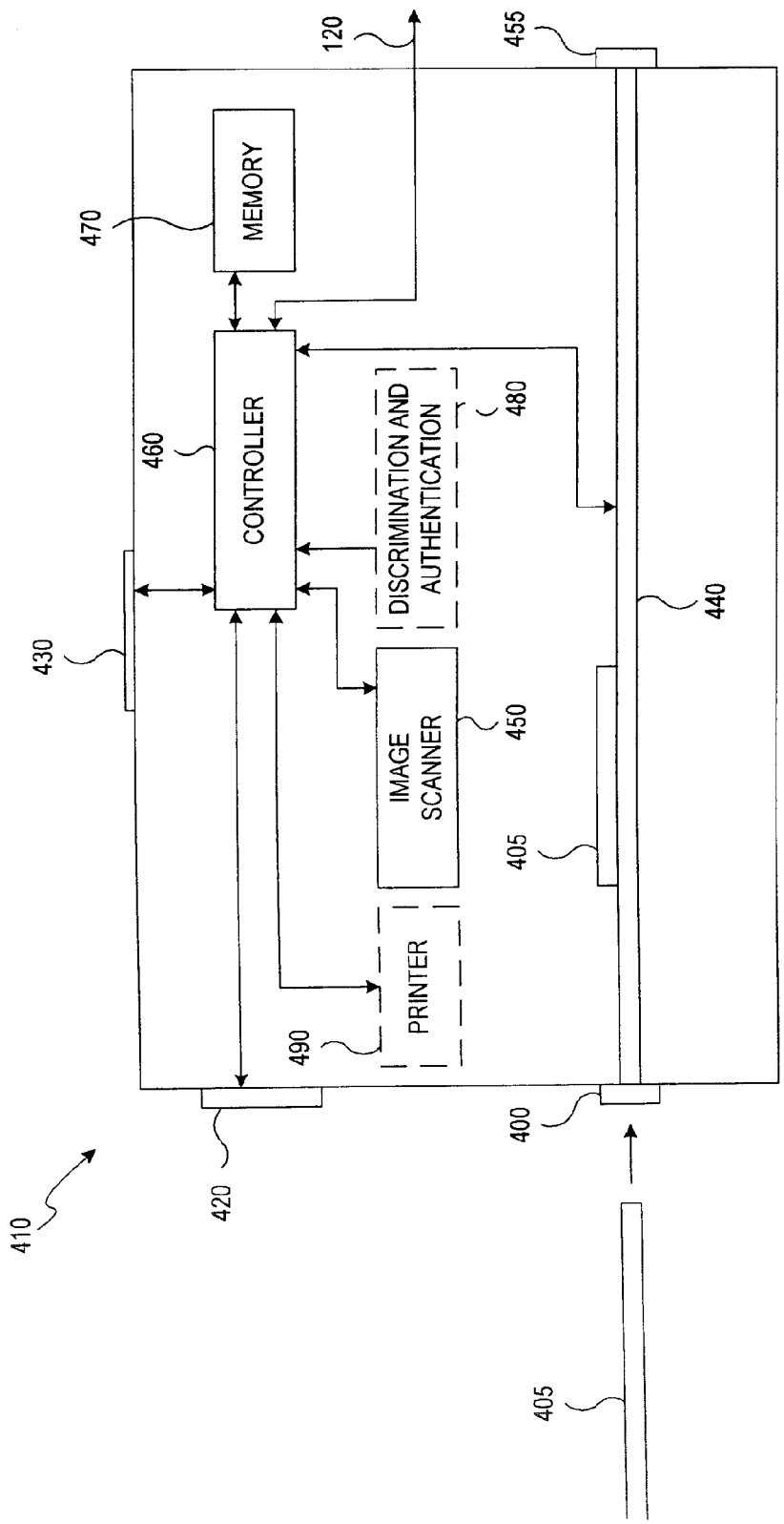
FIG. 4 is a functional block diagram of a document scanning system according to one embodiment of the present invention.

Turning now to FIG. 4, a functional block diagram of one embodiment of a document scanning system 410 will now be described. As mentioned with reference to FIG. 3, a document 405 is placed into the document scanning system 410 through an input receptacle 400. The document 405 may be placed into the input receptacle 400 one at a time or may be placed in a stack. A transport mechanism 440 transports the documents 405 one at a time from the input receptacle 400 past an image scanner 450 to an output receptacle 455. In this embodiment, only one output receptacle 455 is illustrated, but other embodiments include multiple output receptacles 310. A controller 460 is linked to the image scanner 450, the transport mechanism 440, a memory 470, and the operator and user control panels 220, 230. The controller 460 is adapted to control operation of the transport mechanism 440 and the image scanner 450, to communicate information to and from the memory 470, and to communicate information to and from the customer and operator control panels 320, 330.

Once the image scanner 450 receives an instruction from the controller 460, the image scanner 450 scans the document 405, and obtains an image of the document 405. The image may be an image of the entire document 405 (a full image) or it may be of selected portions of the document 405. The image scanner 450 may contain optical character recognition (OCR) software, such as character amount recognition (CAR) or legal amount recognition (LAR), for identifying the characters printed in one or more fields of the document 405. The OCR also recognizes certain fields within the document 405. For example, if the document 405 is a check, the OCR may search the full image for the account number, scan the account number once the field is located, and transfer the determined account number to the memory 470 through the controller 460 for storage. Alternatively, if the document 405 is an invoice, the OCR may search the full image for a dollar amount. Once the dollar amount field is located, the OCR will then scan the dollar amount and transfer an image of the dollar amount to the memory 470 for storage. In an alternative embodiment, the image scanner 450 is directly linked to the memory 470 for transfer and storage of the images.

The memory 470 may be used for either temporary or permanent storage of the images obtained by the image scanner 450. The memory 470 may store the images until the images are transported via the first communication link 120 to the first computer 130. The transportation may occur after a set number of images have been stored, after a predetermined amount of time, or when the memory 470 is full. Alternatively, the memory 470 may be used to store information on tapes, disks, and/or CD-ROMs. The customer may insert a memory storage device into the scanning system 410. After the image scanner 450 obtains images of the document 405 and communicates the images to the first computer 130, the scanning system 410 may save the images to the memory 470, which is then taken by the customer as a receipt. In another embodiment, the memory is removable, but is removed by the first bank for reconciliation purposes. In yet another alternative embodiment, any combination of memories 470 are included.

Next, the transport mechanism 440 may transport the document 405 past a discrimination and authentication unit 480. The discrimination and authentication unit 480 is of the type described in U.S. Pat. No. 5,915,592, which is incorporated herein by reference in its entirety. The discrimination and authentication unit 480 authenticates the document 405 and, in the case of a currency bill, determines the denomination of the bill. With other documents, such as checks, the system may capture information such as the check amount, account number, bank number, or check number. If a document cannot be authenticated or discriminated by the discrimination and authentication unit 480, an alert may be sent via one of the control panels 320, 330 to an operator or customer. In some embodiments, the controller 460 may cause a document that is unable to be authenticated to be flagged and then rejected from the machine. If the document scanning system 410 only has one output receptacle 455, the controller 460 may halt the operation of the machine while the document 405 is ejected into the output receptacle 455. In embodiments where the scanning system 410 has multiple output receptacles 455, the controller 460 may continue operation of the scanning system and merely reject the unauthenticated document 405 to one output receptacle, while authenticated documents are sent to a different output receptacle.

It is also contemplated that the discrimination and authentication unit 480 may not be used for all documents 405 that are input into the system 410. For example, the discrimination and authentication unit 480 may be used to process currency bills and checks, but may not be used in the case of invoice-type documents. In this situation, the discrimination and authentication unit 480 recognizes certain documents, such as an invoice or payment coupon, as being a type of document where no discrimination or authentication needs to be performed. In this case, after the discrimination and authentication unit 480 recognizes the invoice document, the transport mechanism 440 may transport the document to the output receptacle 455.

In another embodiment, it is also contemplated that the discrimination and authentication unit 480 is not included. In this embodiment, the document 405 would be transported past the image scanner 450 and to the output receptacle 455.

In another embodiment of the present invention, a printer 490 is included in the document scanning system 410. The printer 490 may perform a variety of functions. In one embodiment, the printer 490 may be used to print an indicia of cancellation or a "paid" indicia on the document 405. The type of mark used may depend on the type of document 405. For example, a check would have an indicia of cancellation on it, while the invoice may be marked "paid." In another embodiment, the printer 490 may be used to print an image of the check and/or invoice to be physically sent to the customer. The printer 490 used can be any type of conventional printer. For example, depending on the function for which the printer 490 is used, the printer 490 may use conventional printing wheels. In another embodiment, where the printer 490 is only used for one purpose, for example, to cancel the document 405, the printer 490 may be a stamp. In yet another embodiment, the printer 490 may include a series of stamps. For example, one stamp could imprint an indicia of cancellation on a check and another stamp could print "paid" on an invoice. The operation of the printer 490 is controlled by the controller 460.

Figure 5:
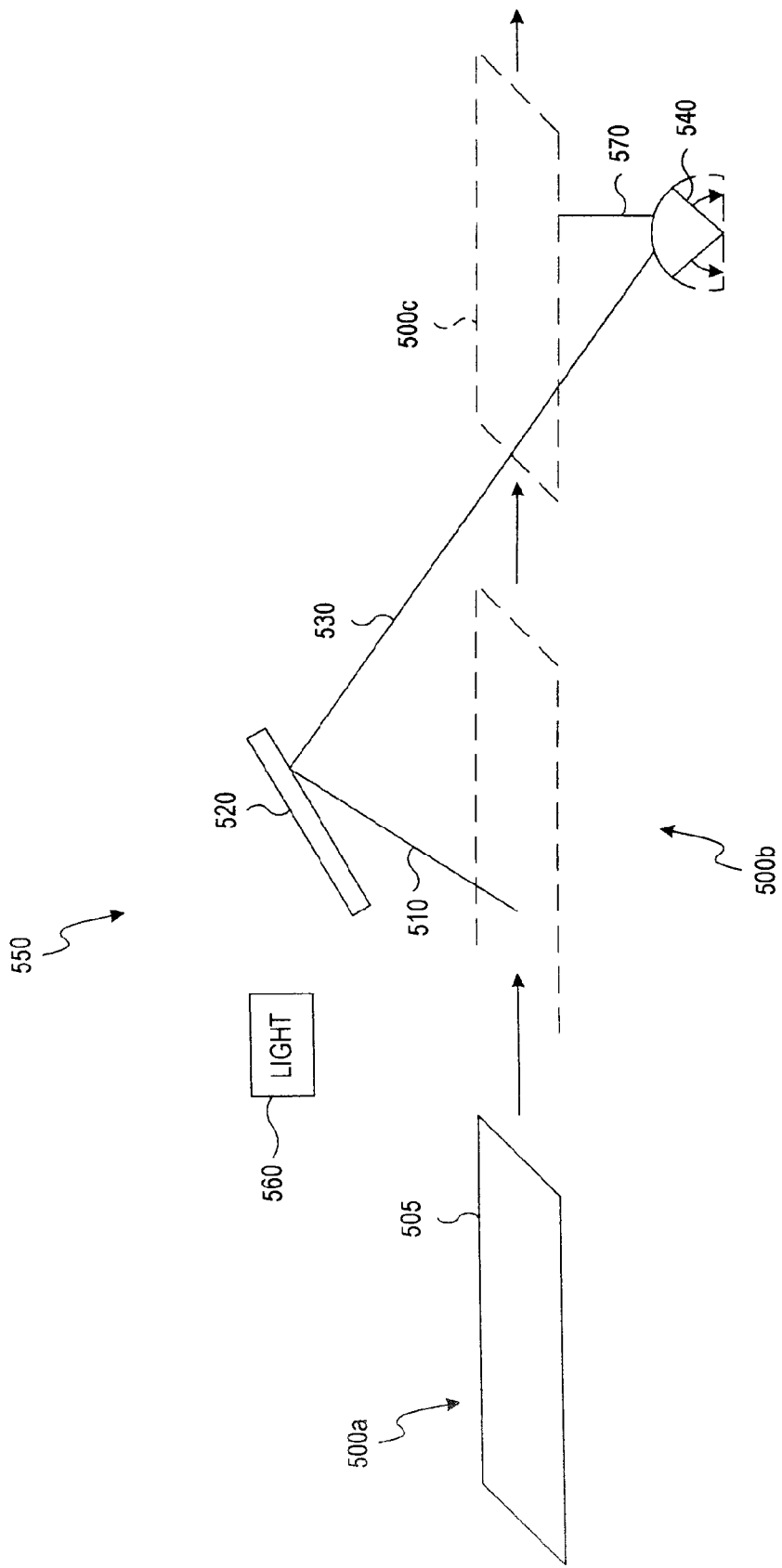
FIG. 5 is a functional block diagram of an image scanner of a document scanning system according to one embodiment of the present invention.

One example of the arrangement of an image scanner 550 for use in the above-mentioned embodiments is described with reference to FIG. 5. A document 505 having two sides, for example, a check, U.S. or foreign currency, or an invoice, is inserted into the document scanning system 310 (shown in FIG. 3) at position 500a. In the embodiment of FIG. 4, the image scanner 450 is adapted to scan both sides of the document 505. Often, the document 505 contains valuable information on both sides and, thus, obtaining an image of both sides is useful. For example, if the document 505 is a check, a first (or front) side of the check may contain payee and amount information, while a second (or back) side may contain endorsement information.

After the document 505 is inserted into the document scanning system 310, the document 505 is transported past a scanning arrangement by the transport mechanism 440 (FIG. 4). When the document 505 moves into a position 500b, it is illuminated by a light 560, causing the image of the first or second sides of the document to travel along a first path 510 to a mirror 520. The image is then reflected by the mirror 520 along a second path 530 to a scan head 540, where the image is obtained. The scan head 540 may be rotatable as shown. The light 560 may be located in various places in the image scanner 450. Thus, one side of the document 505 is imaged using reflection techniques. The document 505 then moves into position 500c where the image of the other of the first and second sides of the document 505 is scanned by the scan head 540 via a path 570. In one embodiment, the transport mechanism 440 stops at the position 500b while, in other embodiments, the transport mechanism 440 operates in continuous motion and does not stop at the various positions for imaging.

The rotation and operation of the scan head 540 may be controlled by the controller 460 illustrated in FIG. 4. Alternatively, the scan head 540 could be rotated based on a time delay (rotates so many degrees every so often). The operation of the scan head 540 may also be in continuous operation. The scan head 540 may scan without interruption as opposed to an embodiment where the scan head 540 is turned on or off via the controller 460.

In accordance with another embodiment of the present invention, the image scanner 550 may be of the type disclosed in U.S. Pat. No. 4,888,812, which is incorporated herein by reference in its entirety.

Figure 6:
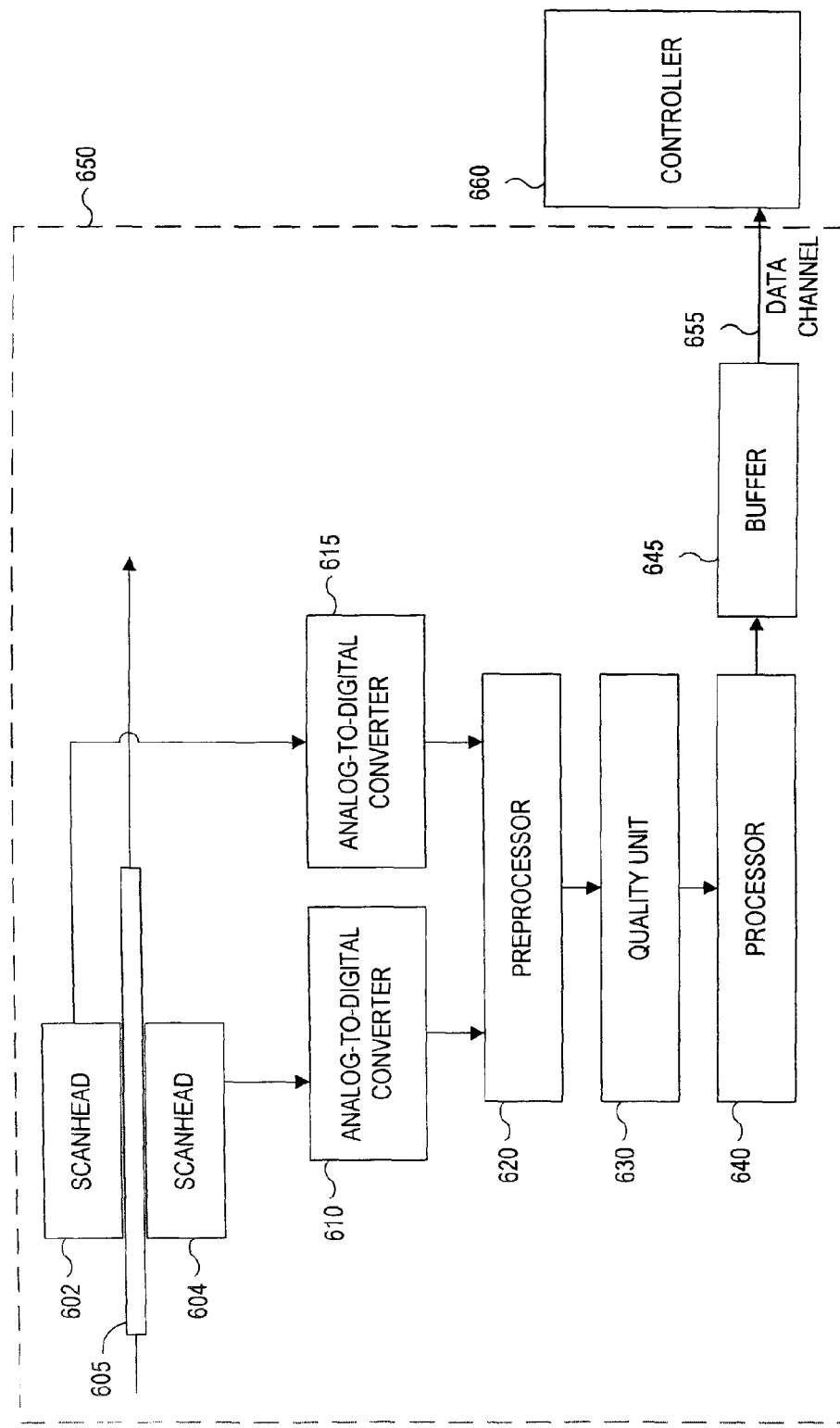
FIG. 6 is a functional block diagram of an image scanner according to another embodiment of the present invention.

In FIG. 6, another embodiment of an image scanner 650 is depicted. In this embodiment, the front and back surfaces of a document 605 are scanned by scan heads 602, 604 and the images are processed into video image data by electronic circuitry. The scan heads 602, 604 are preferably charge coupled scanner arrays and generate a sequence of analog signals representing light and dark images defining the image on the document 605. The scan heads 602, 604 are arranged for simultaneously scanning both the front and back of the document 605 and are connected respectively to analog-to-digital converters 610, 615 which convert the analog values into discrete binary gray scale values of, for example, 256 gray scale levels. Alternatively, the scan heads 602, 604 may be arranged in an offset, or non-overlapping, manner. For example, a non-overlapping arrangement may be useful in isolating light detected by each scan head. The scan heads 602, 604 may be capable of obtaining images of varying resolutions. The particular resolution chosen, which can be varied by the operator, is selected based on the type of document being scanned, as is known in the art.

In the embodiment illustrated in FIG. 6, the high resolution gray scale image data from the analog-to-digital converters 610, 615 is directed to an image data preprocessor 620 in which the data may be enhanced and smoothed and which serves to locate the edges of successive documents. Irrelevant data between documents can then be discarded. If the documents are slightly skewed, the image preprocessor 620 can also perform rotation on the image data to facilitate subsequent processing.

The image data may be monitored for unacceptable image quality by an image quality unit 630. For example, the image quality unit 630 may monitor the distribution of gray scale values in the image data and create a histogram. As is well known in the art, acceptable quality images have a distribution of gray scale values within certain prescribed limits. If the gray scale distribution of the histogram falls outside these limits, this is indicative of poor image quality and an error condition may be generated.

The image data is transmitted from the quality unit 630 to an image processor 640. The image processor 640 may add items to the image. For example, if a document bearing only a signature is scanned, the image processor 640 may add a transaction amount, a payee, and/or other information to the image. As is known in the art, the scan heads 602, 604 can additionally scan specified fields on the faces of the document. For example, when processing checks, the scan heads 602, 604 may be directed by the OCR software to search for the "$" symbol as a coordinate to the left of the numeric check amount field box. As is known in the art, a straight coordinate system or dimension system may be used where known dimensions of the box are used to locate the field. Also, when scanning currency, the scan heads 602, 604 may be directed by the OCR software to search for the serial numbers printed at defined locations which the image processor 640 can locate.

The processor 640 can be programmed to locate fields for various types of currency and perform processing. Based on scanning certain areas on the currency or document, the processor 640 first identifies the type of document, such as type of currency, for example, U.S. bank notes. Then, based on the outcome of the previous step, certain fields of interest are located, and the information is stored for use by the system. For checks, fields of interest may include the name of the bank, the account number, and the amount of the transaction. For U.S. bank notes, the fields of interest may include the dollar amount. For deposit slips, the fields of interest may include the bank name, account number, total amount of deposit, and amount of individual checks or currencies deposited. For invoices, the fields of interest may include the account number, the transaction amount, and the minimum amount due. The processor 640 may also compress the image data, as is known in the art, in preparation for transmission to an outside location and/or storage.

The amount of image data per document may vary depending on the size and nature of the document and the efficiency of the data compression and reduction for that particular document. To insure that no data is lost in the event that the volume of image data temporarily exceeds the transfer capacity of a data channel 655, such as a high speed data channel, a prechannel buffer 650 is interposed prior to the data channel 655, which is connected to a controller 660. The capacity of the pre-channel buffer 650 is continually monitored by the controller 660 so that appropriate action may be taken if the buffer becomes overloaded. The compressed video image data is received by the controller 660 over, for example, a high-speed data channel 760 and is initially routed to temporary storage. The prechannel buffer 650 is preferably of a size capable of storing image data from at least several batches or runs of checks or similar documents, each batch or run containing several checks or documents. The controller 660 in the document scanning system directs the image scanner to perform the functions of analyzing the data. Alternatively, as discussed above, analysis of the data can occur at an office computer or at a personal computer attached to the system.

A personal computer or alternate means may be used to create images of electronic documents that are electronic images only. That is, such documents may be created without scanning physical documents. In such a system, computer software electronically creates an image of a document such as a check. These systems are commonly known in the art. A special printer (not shown) may be connected to the system to print documents with fields of interest.

Other scanning modules and methods can be used in place or in addition to the ones described above. These include CCD array systems, multi-cell arrays, and other well-known scanning techniques. Examples of these techniques and devices are described in U.S. Pat. Nos. 5,023,782, 5,237,158, 5,187,750 and 4,205,780, all of which are incorporated herein by reference in their entireties. The scanning module can also be a color image scanner such as the type described in U.S. Pat. No. 5,335,292, which is incorporated herein by reference in its entirety.

Figure 7:
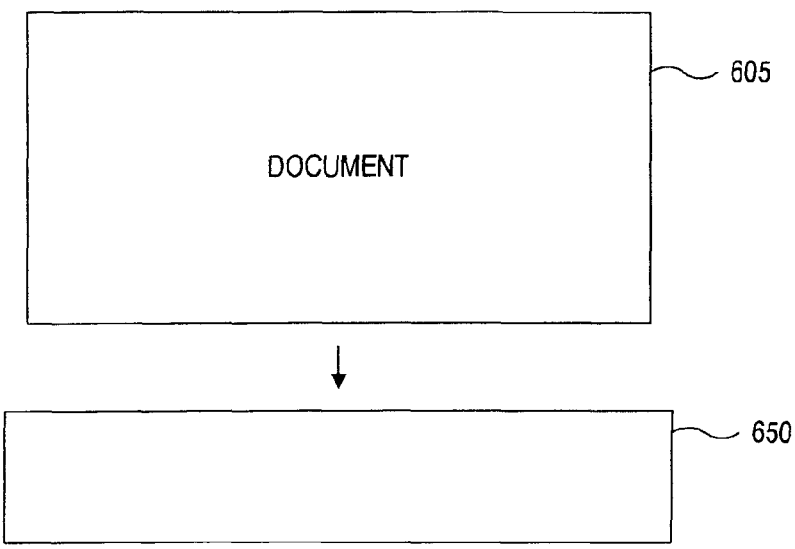
FIG. 7 is a top view of a document being scanned by an image scanner in the wide dimension.
Figure 8:
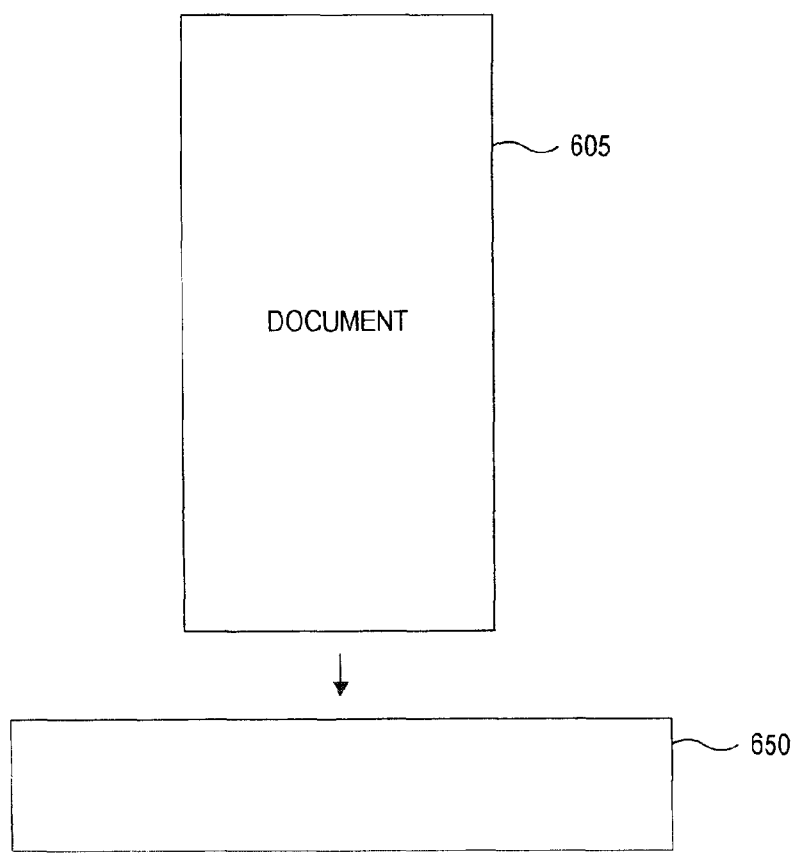
FIG. 8 is a side view of a document being scanned by an image scanner in the narrow dimension.

Turning now also to FIGS. 7 and 8, the document 605 may be transported past the image scanner 650 in a direction that is parallel to its narrow edge (FIG. 7), or the document 605 may be transported past the image scanner 650 in a direction that is perpendicular to its narrow edge (FIG. 8). These embodiments may be incorporated into both the embodiments of either of the image scanners depicted in FIGS. 5 and 6.

Figure 9:
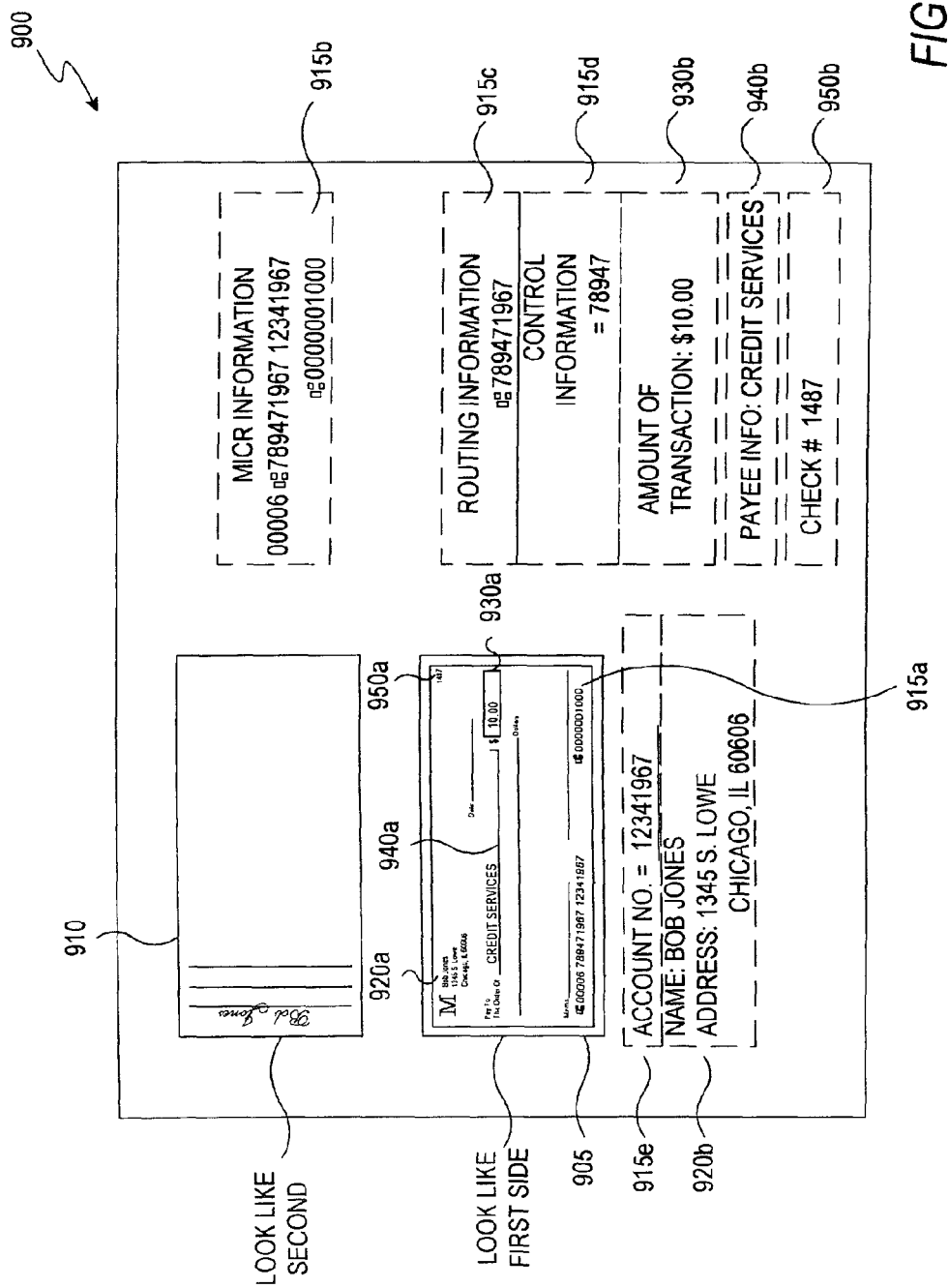
FIG. 9 is a block diagram of an image file of a check according to one embodiment of the present invention.
Figure 10:
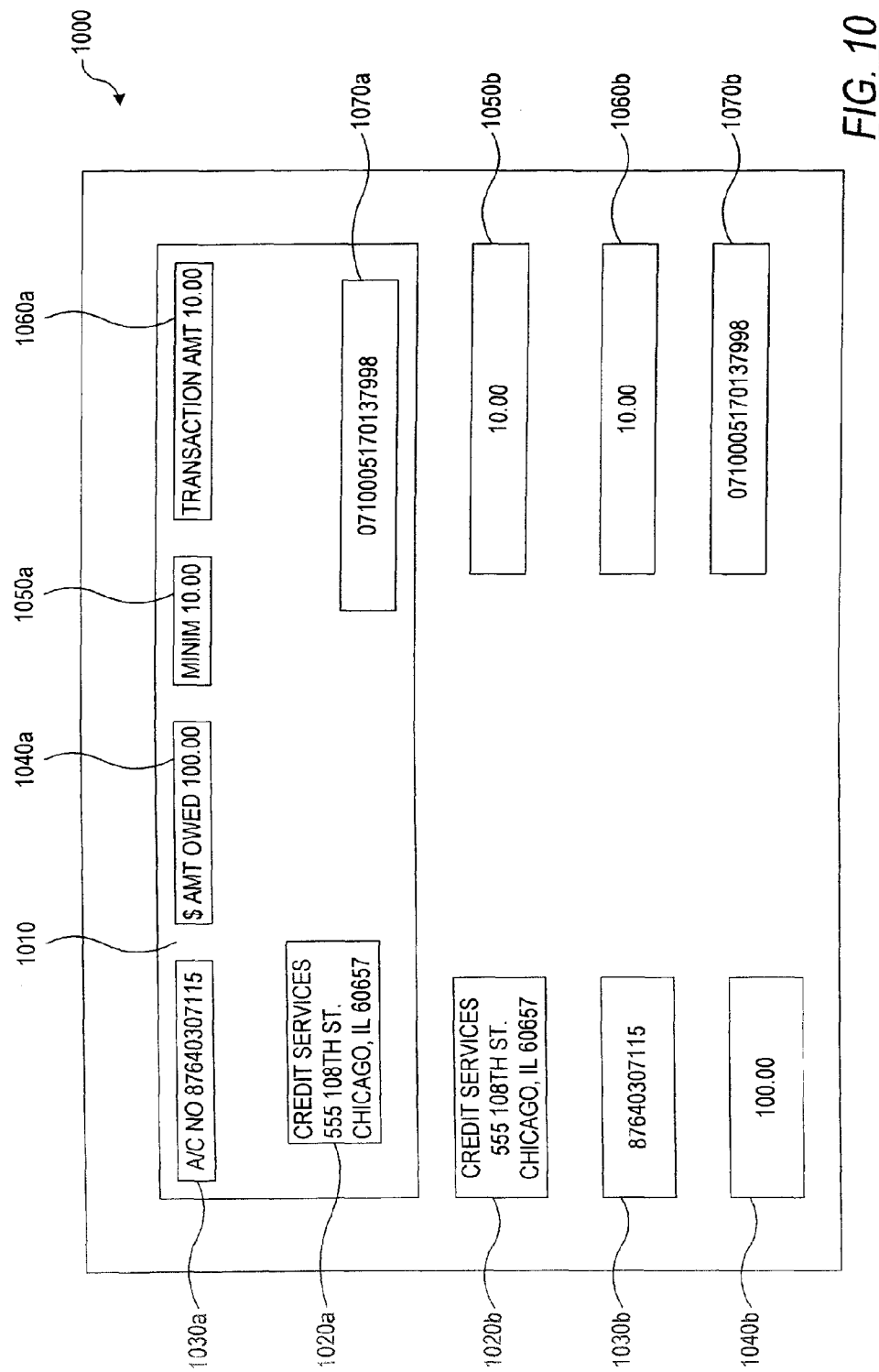
FIG. 10 is a block diagram of an image file of an invoice according to one embodiment of the present invention.

Turning now to FIGS. 9 and 10, an image file of a check and an image file of an invoice are described. Turning first to FIG. 9, a check image file 900 comprises several parts. A first image section 905 represents one side of a scanned check. The image is a collection of encoded data and is represented here pictorially so as to be readily understandable to those skilled in the art. In the check sample shown in FIG. 9, both sides of the check have been scanned. In other embodiments, it may only be desired to scan one side. In the embodiment illustrated, the first image section 905 is the front side of the scanned check. Similarly, a second image section 910 comprises data representing the reverse side of the document, in this case, the back side of the check. Area 915a is the MICR data scanned and is extracted from the full image scan and inserted into a MICR field 915b. The MICR information on the check includes the bank routing number (or ABA number), the payor's checking account number, check number, and may include the dollar amount of the check.

Areas 915c and 915d represent, respectively, routing and control information. The routing and control information is needed so that the image file can be transmitted among financial institutions. The routing information is a number that corresponds to the bank that issued the check. In other words, the bank to which the image file belongs can easily be recognized by an operator. The areas 915c and 915d may be extracted from the area 915a or from the MICR encoding on the check. The numbers illustrated are used as examples and are not meant to represent the exact digits or number of digits used.

Also taken from the MICR encoding line on the check is field 915e, which contains the account number for the check extracted from the image of the check. The account number allows an operator to know which account was debited for the funds.

To further aid the operator in recognizing the account, a field 920b may be included in the image file and contains data indicating the name and address of the owner of the account. This information is taken from an identification section 920a on the image file. Normally, this information is on the upper left side of the check and usually includes at least the name of the owner of the account, and may include address and telephone information.

On the written portion of the check, an amount of transaction is indicated in an amount box 930a. This information may be read from the image and inserted into an amount field 930b. Other written information, such as a payee name 940a, may also be extracted from the full image and added into a field 940b. A check number 950a may be extracted and added into a field 950b to provide a clearer indication of the check number. It should be recognized that the fields illustrated are not inclusive of all possible fields and types of information which can be stored in the image file 900. Indeed, other types of information can be stored as can pointers to other files having, for example, further information relating to the customer. In some cases, it may also be useful to read the memo line of the check. In addition, it is contemplated that an operator may fill in some of these fields. For example, in an embodiment of the present invention that only requires the customer to sign the document, the payee field and amount field may be added to the image before it is processed. The format of the file is standardized for ease of processing, i.e., using .tif or .jpg. This allows other software to process the information in image files for use by the merchant or financial institution.

FIG. 10 depicts an image file 1000 of the invoice according to one embodiment of the invention. A full image of either or both sides of the invoice may be obtained. In this embodiment, it is only a first side 1010 of an invoice that is included in the image file 1000. The first side 1010 contains an address 1020a having the name and address of the company. The address 1020a may be extracted and inserted into an address field 1020b. A field 1030a contains an account number of the customer at the payee. The customer's account number on the invoice is different than the account number on the check in FIG. 9. The account number on the check is the customer's account number at the bank or the account number that is going to be debited to pay the customer's account at the payee. For example, if a customer owes utility A money, utility A will send the person an invoice indicating the amount of payment and the customer's account at the utility. The customer then writes a check drawn on an account at a bank to pay their account at the utility. It is important that the account number 1030a is clearly imaged, because field 1030b informs the company where to apply the funds received.

Numerous invoices contain various dollar amounts that may be owed by a customer. For example, on a standard credit card invoice, the invoice will include a total amount owed 1040a, a minimum amount to be paid 1050a, and a transaction amount 1060a. These amounts may differ. In the illustrated embodiment, the total amount owed 1040a is $100.00, the minimum amount to be paid 1050a is $10.00, and the transaction amount 1060a is also $10.00. In practice, the transaction amount 1060a may be any number, but usually it lies between the minimum amount to be paid 1050a and the total amount owed 1040a. The total amount owed 1040a, the minimum amount to be paid 1050a, and the transaction amount 1060a may all be extracted and put into separate fields 1040b, 1050b, 1060b, respectively, in the image file 1000. Alternatively, any combination of these fields may be extracted in addition to any other fields that may be useful for the payee, customer, payee bank, and/or payor bank.

In order for the payor bank to transmit the funds to the payee bank, the payor bank must be able to ascertain the payee bank's routing number and the account number at the payee bank to be credited. This information may be included on the invoice image file 1000, as illustrated by a line 1070a. The line 1070a provides the routing number and account number for the payee. The line 1070a may be extracted and inserted into a bank routing field 1070b and into a payee account number field 1070c. These two fields may also be input by the operator or customer if the information was not included on the invoice.

In both the image files 900 and 1000, there is certain information that should be the same. For example, a customer wanting to pay an invoice from Credit Services should have a check that names Credit Services as the payee. Also, the transaction amount field 960b of the check (FIG. 9) should match the amount field 1030b on the image file 1000 of the invoice. As discussed above, in one embodiment, the document scanning system 310 includes control panels 320, 330 (FIG. 3). The control panels 320, 330 may be used to view the image files 900 and 1000 to insure that the certain fields match. This would alleviate accounting problems for both the customer and the payee in reconciling the customer's account with the payee.

In one embodiment, the image files 900, 1000 only include the full images of the check and invoice. In this embodiment, none of the data is extracted and added to the image file. In this embodiment, both the payee bank and payor bank would extract required information as needed to process the images.

In yet another alternative embodiment, only the extracted fields, and not the full image, would be transmitted to the payor bank and the payee bank. In this embodiment, the full images may be discarded or the extracted fields may be imaged directly from the document as mentioned above.

Figure 11:
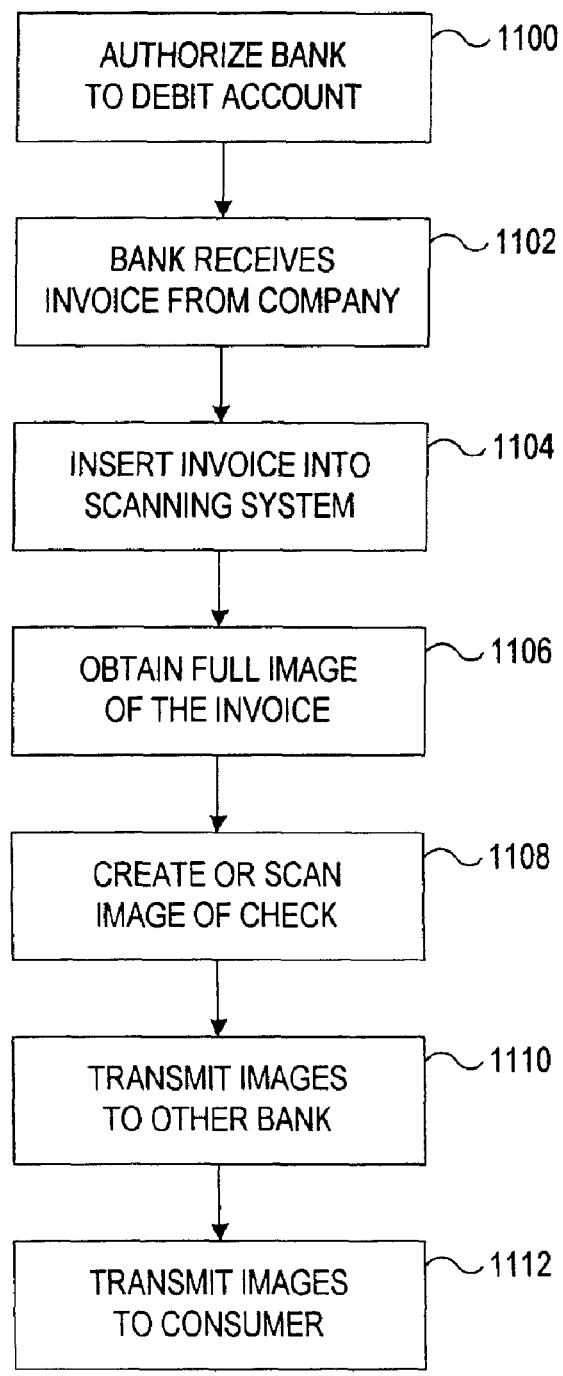
FIG. 11 is a flowchart describing the operation of another embodiment of the present invention.

Turning now to FIG. 11, a flow chart illustrating how one embodiment of the present invention operates is described. In this method, instead of an invoice being mailed to a customer, the invoice is sent directly to a bank. First, as shown in step 1100, the customer authorizes the bank to debit an account belonging to the customer to pay the invoice. This may be done in a manner that is similar to other debit agreements banks have with their customers, such as authorizations to debit the account to pay fees or to allow automated clearinghouse transfers (ACH). The bank also needs to be provided with information regarding how much of the invoice should be paid. For some companies, the entire invoice must be paid (utilities, some credit cards). For others, however, including most credit cards, the customer is given a minimum that must be paid and the balance may remain owed. The customer may provide the bank with instructions to pay the entire invoice when it is presented, only the minimum, or some other predetermined amount. It is also contemplated that the customer could alter this amount on a monthly basis depending on the balance in the account. In another embodiment, the customer may have instructions to pay the invoice after a certain date, or pay as much of the invoice as possible, while leaving a minimum balance in the account.

Once the authorization is established, the process proceeds to step 1102, where the bank receives the invoice directly, instead of the customer. In another embodiment, the customer could receive the invoice and then notify the bank of payment instructions, such as dollar amount, and payee and bank information.

At step 1104, an operator inserts the invoice into a document scanning system. The operator may be an employee or contractor of the bank. The document scanning system then obtains a full image of the invoice in step 1106. The image may be a full image of the document or it may only be of a selected portion of the document. Optical character recognition software (OCR) may be included in the scanning system. The OCR may "read" the image for relevant information, such as the P.O. box number, account number, transaction amount, total amount owed, and minimum amount due.

Next, at step 1108, the operator may create an image of a check for payment. This image may contain all the data commonly found on a check, or it may only contain the data that is needed to conduct the transaction, such as bank routing number, account number, and transaction amount. In another embodiment, the bank operator may fill out an actual check and insert it into the document scanning system for scanning. In another embodiment, the customer may have provided the bank with checks that are already filled out and the operator need only scan the appropriate check. In both of these embodiments, the OCR may again read the whole image or search for the needed images only for processing. In all of these embodiments, it is contemplated that the operator may input any needed information onto the image. For example, if a scanned invoice is lacking a transaction amount, the transaction amount may be keyed in by the operator and, thus, added to the image of the invoice. In one embodiment, the only portion of the check that is filled out is the signature, while the rest of the data is added to the image in such a manner by the operator.

At step 1110, the scanned images are transmitted electronically to the company's bank for payment and processing. There are numerous ways the customer's bank may obtain the company's bank information. The information may be included on the invoice or it may be obtained from the company or the customer. The electronic payment may be processed as a check, whereby the customer's account is not debited until the check is sent back to the customer's bank to be honored. In another embodiment, the payment may be made by a cashier's check. Here, the customer's account is debited immediately, but the funds are still sent to the company's bank via the mail system. In another embodiment, the electronic payment may be paid as an automated clearinghouse payment, such that the funds are first deducted from the customer's account and then electronically transferred along with the images to the bank of the customer.

Once the invoice has been paid, the images are transmitted to the customer in step 1112. This may be done electronically where the images themselves are sent to a customer's website or e-mail address. The images may also be saved on a disk, tape, or other recordable device and then mailed to the customer. In another embodiment, the images of the check and the invoice are printed and mailed to the customer as the invoices are paid. This embodiment would be ideal for people who do not own a computer or do not feel comfortable using a computer for transactions which include account numbers. In another embodiment, the bank may print the images of the scanned items and include the items in the customer's regular bank statement. It is also contemplated that the actual invoice and check (if there is a hard copy) may be stamped with indicia of cancellation or payment and returned to the customer via any of the above-mentioned processes.

Figure 12:
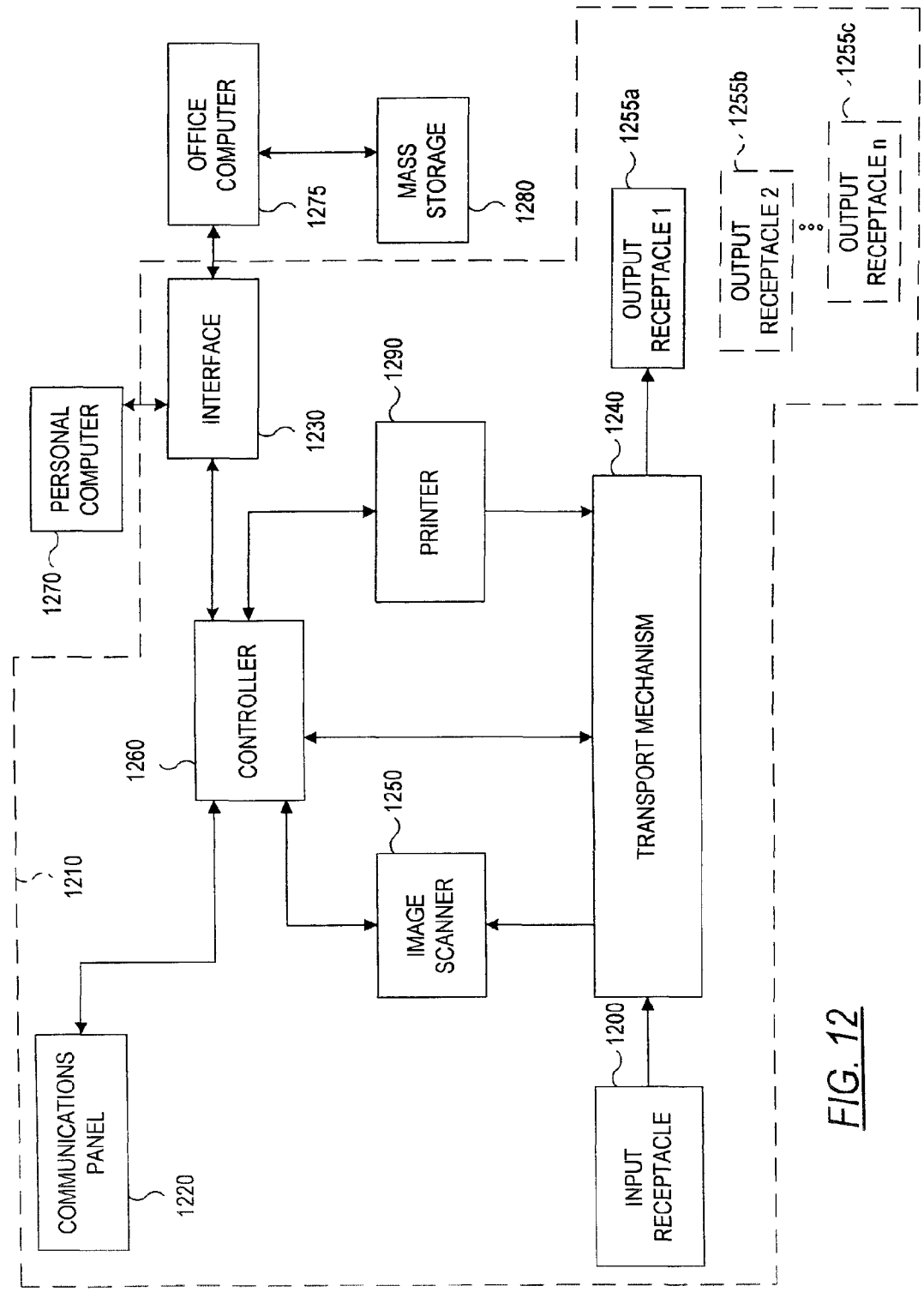
FIG. 12 is a functional block diagram of the components of a document scanning system according to an alternative embodiment of the present invention.

Turning now to FIG. 12, another embodiment of a document scanning system 1210 is described. As illustrated in FIG. 12, the document scanning system 1210 includes an input receptacle 1205 adapted to receive documents from an operator or a customer. The input receptacle 1205 may be one input opening, slot, or bin capable of receiving both invoices and checks to be deposited. Alternatively, the input receptacle 1205 may be two bins, openings, or slots adapted to receive different types of documents. For example, one of the input bins may be adapted to receive only checks, while the other may receive invoices. In other embodiments, the input receptacle 1205 may be of a plurality of input bins, openings, and/or slots, with a separate input for each type of document the scanning system 1210 is capable of accepting.

A transport mechanism 1240 is coupled to the input receptacle and is adapted to carry the documents, one at a time, from the input receptacle 1205 past an image scanner 1250, and to an output receptacle 1255. As illustrated in the drawing, the scanning system 1210 has at least one output receptacle, but may have any number of output receptacles 1255*a-n*. In one embodiment, there are two output receptacles 1255*a-b*. Documents that are scanned properly may be transported into one output receptacle 1255, while documents that are believed to be counterfeit or are not properly scanned may be off sorted to another output receptacle. Also, if there are two types of documents being scanned, checks and invoices, the checks may be transported to one output receptacle 1255, while the invoices are transported to another output receptacle 1255. In an embodiment having three output receptacles 1255*a-c*, each receptacle may receive different types of documents, or one receptacle 1255 may be used to off sort certain documents.

The image scanner 1250 operates similarly to the image scanner 450 in FIG. 4. The image scanner 1250 may obtain full images of the documents or it may only obtain partial images of the documents. The image scanner 1250 also transmits these images to a controller 1260.

The controller 1260 is coupled to the image scanner 1250 and the transport mechanism 1240, and controls the operation of both of these devices. The controller 1260 also communicates information to and from the image scanner 1250. As described above, the image scanner 1250 transmit images to the controller 1260. The controller 1260 may also transmit information to the image scanner 1250 instructing the image scanner 1250 to create image files of the images and what to include in these image files. Alternatively, the controller 1260 may take the images transmitted by the image scanner 1250 and create image files that include the information discussed in FIGS. 9 and 10.

The controller also controls the operation of a printer 1290. The printer 1290 may be used to perform a variety of functions. In one embodiment, the printer 1290 may be used to print the payment agreement on the document. The timing of the printing operation is controlled by the controller 1260. According to one embodiment, the printer 1290 automatically prints the payment agreement on the document. The printer 1290 may also be used to print an indicia of cancellation on a document. For example, if a check is being scanned for electronic transfer purposes, the printer 1290 may print "cancelled," "void," or other such language on the check. The printer 1290 may also operate as does the printer 490 described in FIG. 4.

Also controlled by the controller 1260 is a communications panel 1220. The communications panel 1220 may be used by an operator and/or customer to input information into the image file. Also, the controller 1260 may communicate information to the communications panel 1220. For example, the controller 1260 may instruct the communications panel 1220 to display a message to the operator or customer that the image scanning is complete or that a problem has occurred. The communications panel 1220 may include a numeric keypad, a standard keyboard, denomination keys, a touch screen panel, and/or an electronic pen and screen. All of these devices would allow the operator or customer to input information into the scanning system 1210.

The controller 1260 is also in communication with an interface 1230. The interface 1230 receives information from the controller 1260 and adapts it to be transmitted to an office computer 1275 and/or a personal computer 1270. The personal computer 1270 may be a computer owned by the customer, the computer adapted to receive information such as confirmations that a transaction occurred. For example, if a check written by a customer is scanned and, through the operation of this system, debits an account owned by the customer, the interface may transmit a confirmation to the personal computer 1270. The confirmation may simply be a message indicating that the payment was made or it may include copies of the images of the documents for record keeping purposes. It is also contemplated that the personal computer 1270 may be a computer owned by the payee on the scanned check and may be used to provide the payee with confirmation of the transaction. In another embodiment, two personal computers are linked to the interface, one of the computers is operated by the customer and the other is operated by the payee. In this embodiment, both computers may receive confirmations of the transaction.

The office computer 1275 is the same as the first computer 130 in FIG. 1, and is operated by the payor bank to debit the customer's account for the amount of the check. The office computer 1275 receives the images from the interface, debits the customer's account, and then utilizes the payee information to electronically transfer the funds to the payees account. For reconciliation purposes, a mass storage 1280 is electronically connected to the office computer and may be used to store the images. The mass storage 1280 may be used to store data for record keeping purposes in case a discrepancy were to arise. Also, the mass storage 1280 may be used to temporarily store images until a statement is sent to a customer. The office computer 1275 may retrieve images relating to the customer's account to be included in the monthly bank statement.

The document scanning system 1210, via the link with the office computer 1275, may process transactions substantially immediately. That is, withdrawals may be processed in real time rather than waiting for the end of the day. Alternatively, the document scanning system 1210 may transfer the funds at set periods during the day. For example, the funds and images could be transferred once an hour or once a shift. Alternatively, the office computer 1275 could direct the controller when to transfer the images.

Figure 13:
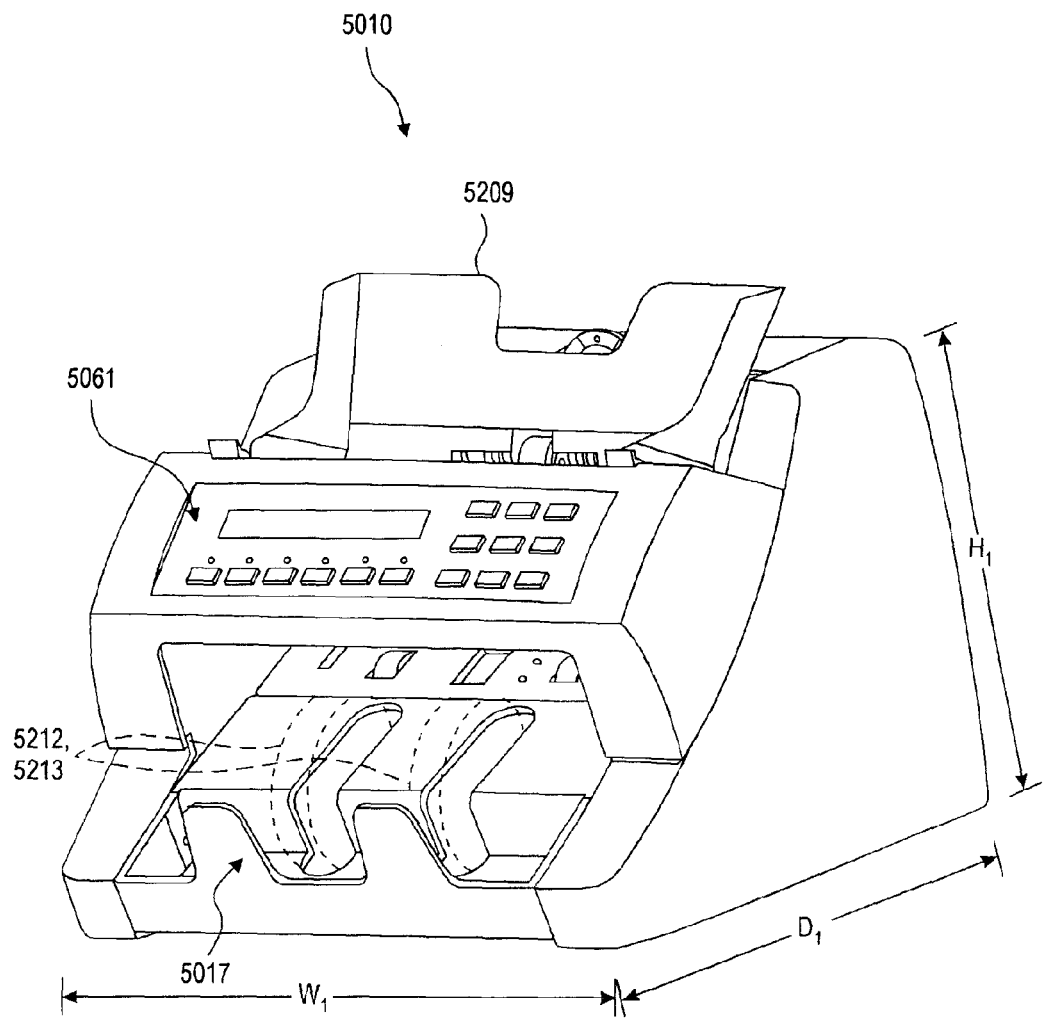
FIG. 13 is a perspective view of a compact document processing system according to one embodiment of the present invention.
Figure 14:
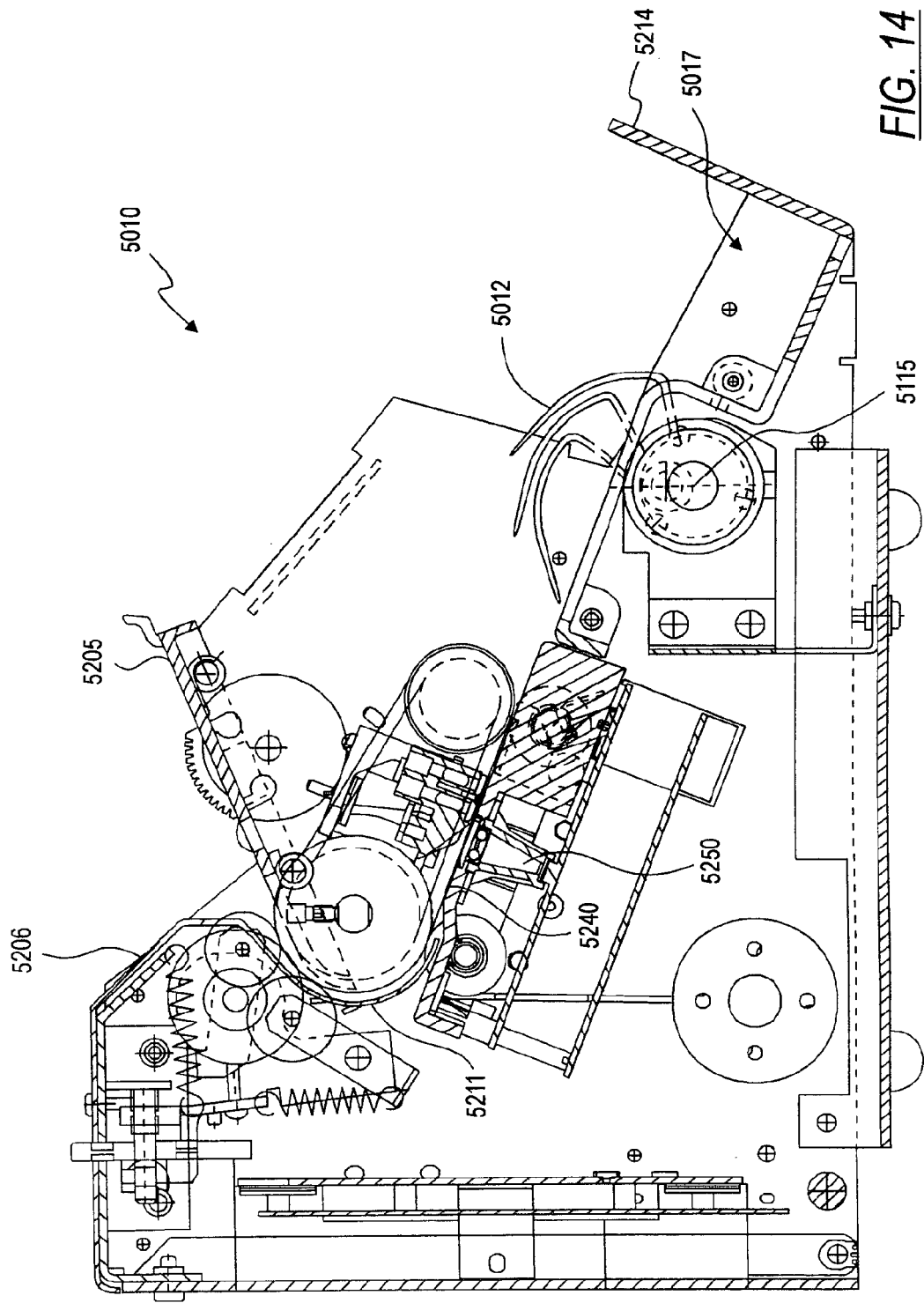
FIG. 14 is a side cross-sectional view of the embodiment shown in FIG. 13.

FIGS. 13 and 14 depict a compact document scanning system according to one embodiment of the present invention. One embodiment of a compact document scanning system is described and illustrated in more detail in U.S. Pat. No. 5,687,963, which is incorporated herein by reference in its entirety. In FIGS. 13 and 14, documents are transported, one by one, from a stack of documents placed in an input receptacle 5209 onto a transport mechanism. The transport mechanism includes a transport plate or guide plate 5240 for guiding a document to an output receptacle 5017. Before reaching the output receptacle 5017, the document can be, for example, evaluated, analyzed, counted, and/or otherwise processed by a full image scanning module. In one embodiment, documents such as checks or invoices are transported, scanned, and identified at a rate in excess of 600 documents per minute. In another embodiment, documents such as checks or invoices are transported, scanned, and identified at a rate in excess of 800 documents per minute. In yet another embodiment, documents such as checks or invoices, are transported, scanned, and identified at a rate in excess of 1000 documents per minute. In another embodiment, documents such as checks or invoices, are transported, scanned, and identified at a rate in excess of 1200 documents per minute.

The input receptacle 5209 for receiving a stack of documents to be processed is formed by downwardly sloping and converging walls 5205 and 5206 (see FIG. 14) formed by a pair of removable covers (not shown) which snap onto a frame. The converging wall 5206 supports a removable hopper (not shown) that includes vertically disposed side walls (not shown). U.S. Pat. No. 5,687,963 also describes one embodiment of an input receptacle in more detail. The document scanning system 5010 in FIG. 13 has a touch panel display 5061 in one embodiment of the present invention which displays "functional" keys when appropriate. The touch panel display 5061 simplifies the operation of the multi-pocket document processing system 5010. Alternatively or additionally, physical keys or buttons may be employed.

From the input receptacle 5209, the documents are moved in seriatim from a bottom of the stack along a curved guideway 5211 (shown in FIG. 14) which receives documents moving downwardly and rearwardly and changes the direction of travel to a forward direction. Although shown as being fed from the bottom, the documents can be fed from the top, front, or back of the stack. The type of feeding used could be friction feed, vacuum feed, or any other method of feeding known to those skilled in the art. An exit end of the curved guideway 5211 directs the documents onto the transport plate 5240 which carries the documents through an evaluation section and to the output receptacle 5017.

Stacking of the documents in one embodiment is accomplished by a pair of driven stacking wheels 5212, 5213 for the output receptacle 5017. The stacking wheels 5212, 5213 are supported for rotational movement about respective shafts 5115 journalled on a rigid frame and driven by a motor (not shown). Flexible blades of the stacking wheels 5212, 5213 deliver the documents onto a forward end of a stacker plate 5214.

According to one embodiment, the document scanning system 5010 is compact, having a height ($H_1$) of about 9½ to 10½ inches, a width ($W_1$) of about 10¾ to 11¾ inches, and a depth ($D_1$) of about 12 to 16 inches.

Figure 15:
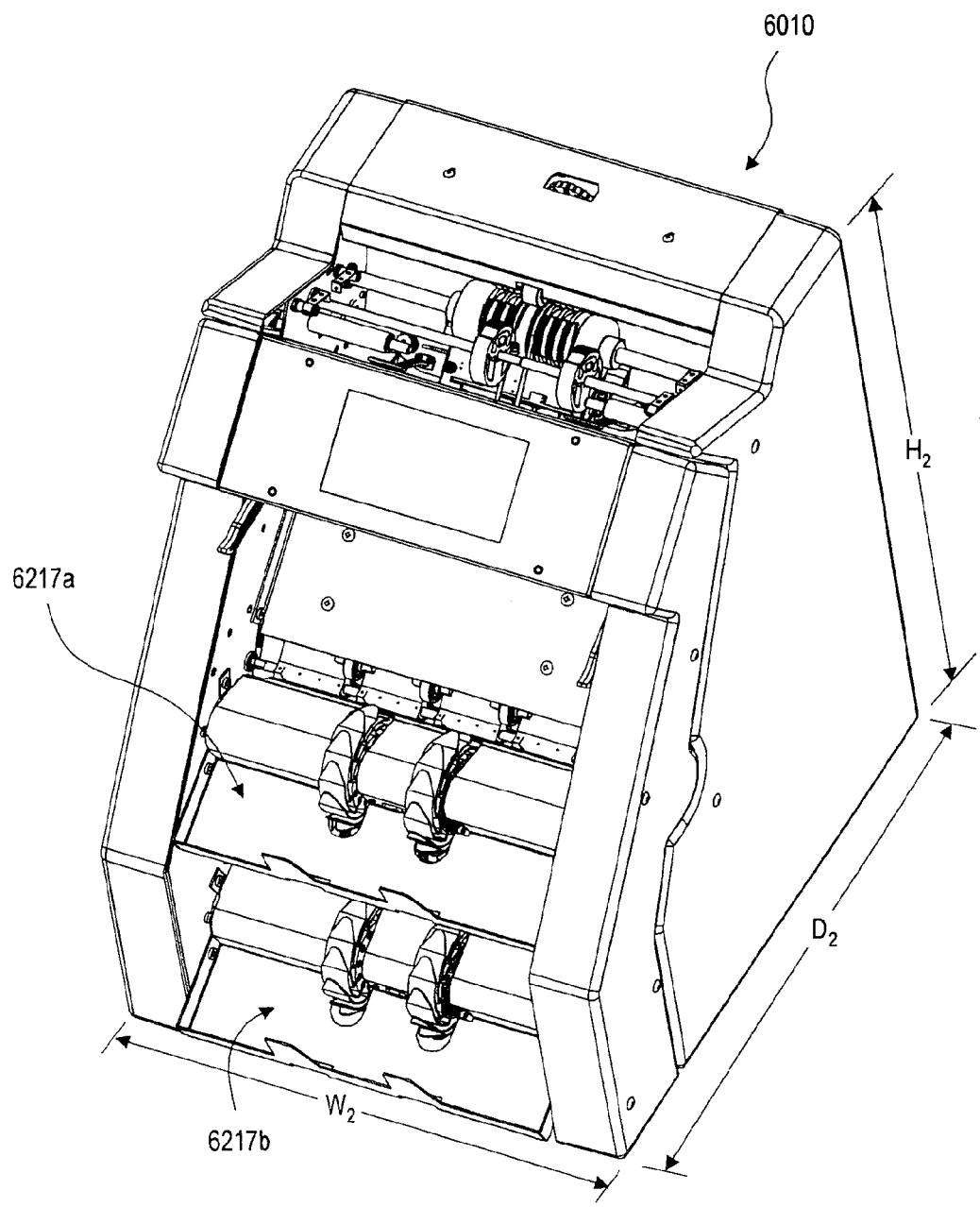
FIG. 15 is a perspective view of a compact document processing system according to another embodiment of the present invention.
Figure 16:
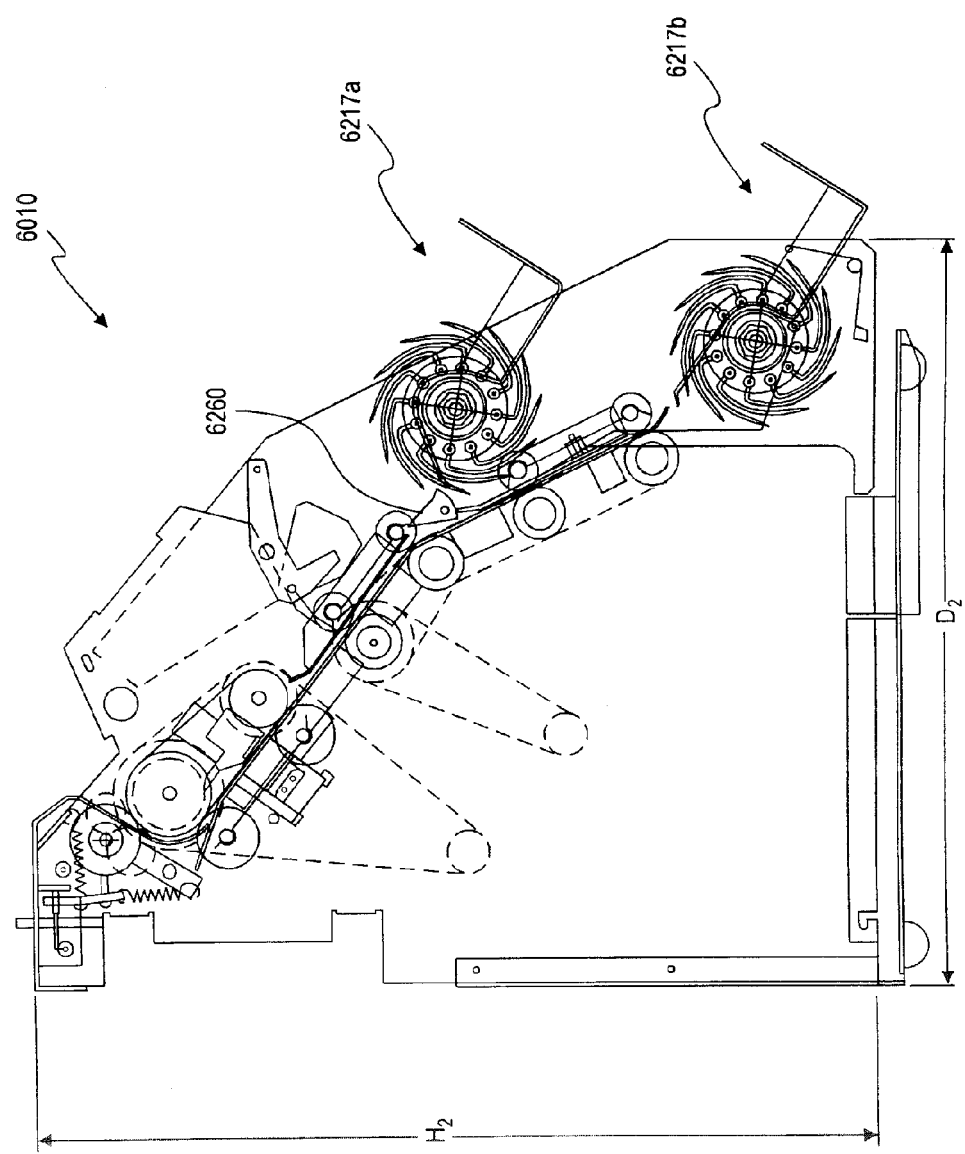
FIG. 16 is a side cross-sectional view of the embodiment shown in FIG. 15.

FIGS. 15 and 16 depict an exterior perspective view and a side cross-sectional view of a compact multi-pocket document scanning system 6010. The process for carrying documents through the system is the same as discussed above, except that the processing system has two output receptacles 6217a, 6217b. In this embodiment, a diverter 6260 directs the documents to either the first or second output receptacle 6217a, 6217b. When the diverter 6260 is in a lower position, documents are directed to the first output receptacle 6217a. When the diverter 6260 is in an upper position, documents proceed in the direction of the second output receptacle 6217b.

According to one embodiment, the document scanning system 6010 is compact, having a height ($H_2$) of about 17½ inches, a width ($W_2$) of about 13½ inches, and a depth ($D_2$) of about 15 inches. According to another embodiment, the document scanning system has dimensions of a height ($H_2$) of about 18 inches, a width ($W_2$) of about 13¾ inches, and a depth ($D_2$) of about 16 inches. The document scanning device 6010 may be rested on a tabletop.

Figure 17:
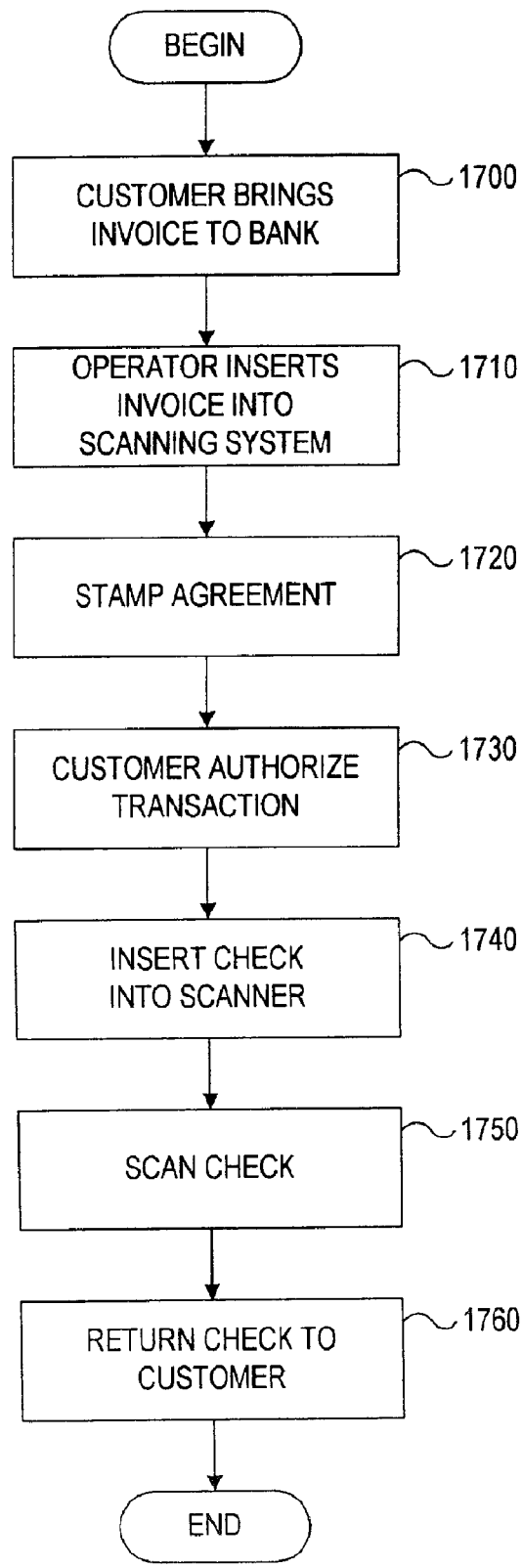
FIG. 17 is a flowchart describing the operation of another embodiment of an automated payment system.

FIG. 17 depicts a flow chart for another embodiment of the present invention. In this embodiment, the customer receives the invoice directly and may bring it to the bank or a location having the scanner to pay the bill. In step 1700, the customer brings the payment coupon or invoice to the bank. For demonstration purposes only, a bank will be used as the place of payment. It is also understood, however, that the place of payment may be anywhere with a scanning system of the present invention. For example, it is contemplated that currency exchanges may have document scanning systems and charge a fee for the service. Also, it is contemplated that other sites that currently offer customers invoice payment services (such as department stores that have drop boxes for payment of in-house credit cards or other locations that accept payment of utility bills) may offer the document scanning system of the present invention as a new method of payment. It is also contemplated that the document scanning systems may be stand alone machines which operate in the same manner as an Automated Teller Machine (ATM).

Returning now to FIG. 17, at step 1710, an operator inserts an invoice and a check or other payment media into the document scanning system. The term "operator" refers to anyone who is operating the machine. It may be a bank or store employee, an independent contractor working for the bank or store, or it may be the customer if a stand alone machine is being used. At step 1720, the document, for example, the check, is stamped with payment or authorization agreement. The payment agreement may be printed on the document by the document scanning system as described above with reference to FIG. 4. Alternatively, it is also contemplated that the payment agreement may be stamped manually onto the document. It is also contemplated that a separate document, such as a receipt, may be stamped with the payment agreement or has the payment agreement printed on it. This process would be similar to issuing a credit card receipt to be signed. The payment agreement allows the bank to debit the customer's account through an electronic transfer, which is different than the conventional clearing path used by banks and other financial institutions in clearing a check. The payment agreement may be printed on the document using a number of the methods discussed above with reference to FIG. 4.

In another embodiment, step 1720 is eliminated and the customer only has to sign the document once. The document scanning system would add to the image any other fields which were desired, i.e., payee name and amount. Also, it is contemplated that a printer would then print this additional information on the document as a receipt, but such a step is not required.

Next, at step 1730, the customer authorizes the transaction. This may be done via signing the document after the agreement has been printed on it, giving a verbal authorization, selecting a button on a communication screen, or signing an electronic signature pad. If a signature is used, it may be handwritten, stamped, or made via other conventional means or may be, for example, an electronic signature. If verbal authorization is given, step 1720 may be eliminated, and the authorization need not be printed on the document. If verbal authorization is given, a printer may print "authorized verbally" or like terms on the document. Also, the image may be tagged with such indicia of authorization.

At step 1740, the check is placed into the document scanning system by the operator. Next, at step 1750, the document scanning system, using full image scanning techniques, scans the check and obtains information from the check for use in the clearing and processing system. The document scanning system may scan for any indicia of cancellation. If some indicia of cancellation is found on the document (indicating that the document has already been processed), the process is terminated and the appropriate authorities may be informed. Also, if the document contains some indicia of cancellation, it is also contemplated that the document would not be returned to the customer, but instead be held by the operator or issuing bank. If no indicia of cancellation is found, the check images may be sent to a central clearinghouse (or first computer 130 as shown in FIG. 1) where the images are processed and payment authorization is made. Some indicia of cancellation may be added to the check, either by the document scanning system or by hand. Finally, at step 1760, the check is returned to the customer, as described below.

Figure 18:
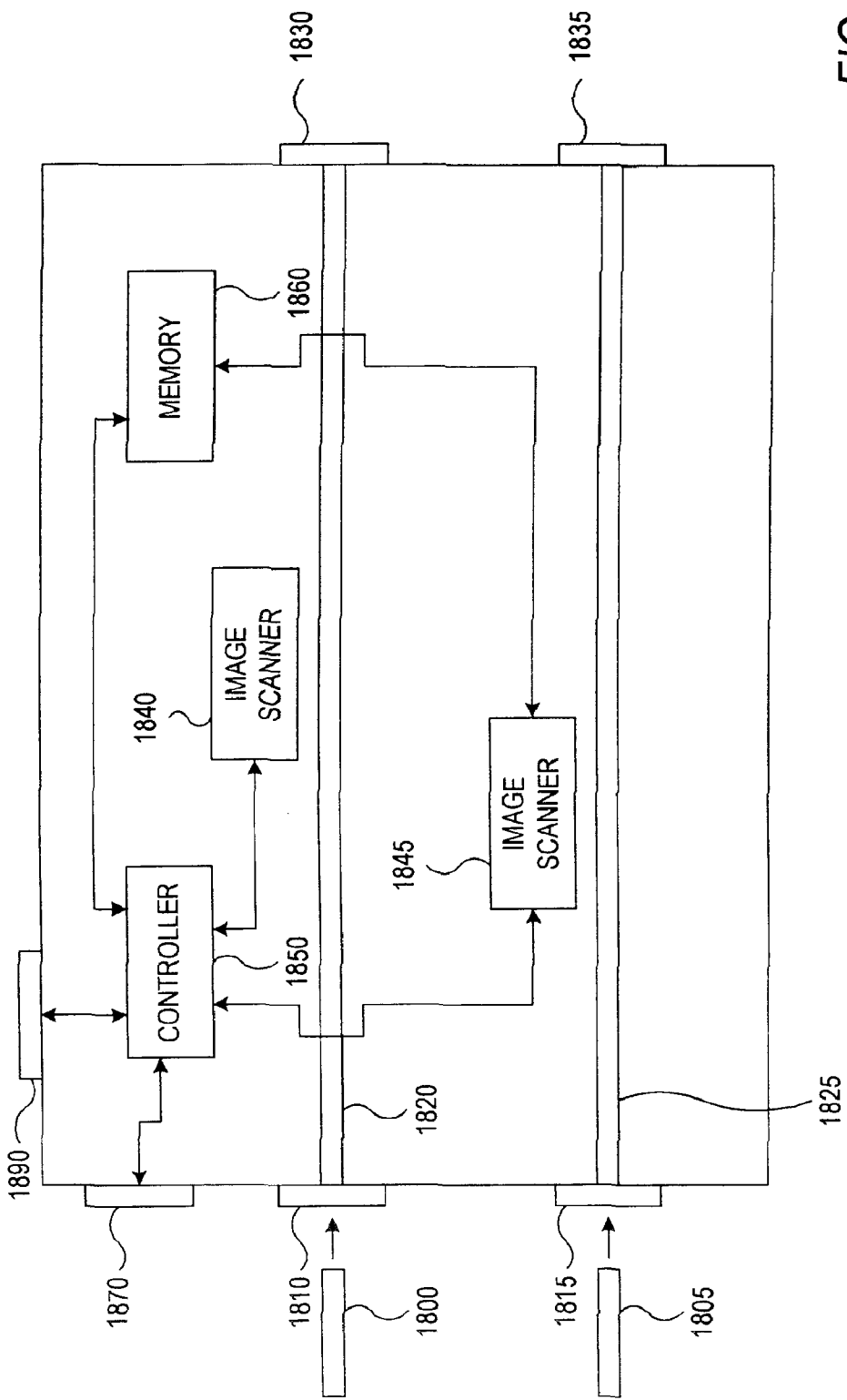
FIG. 18 is a functional block diagram of the components of a document scanning system according to one embodiment of the present invention.

Turning now to FIG. 18, an alternative embodiment of a document scanning system will be described. In the current embodiment, a check 1800 is placed into a scanning system through an input receptacle 1810, which may be a document receiving opening or receptacle, of the scanning system. A transport mechanism 1820 moves the check 1800 past an image scanner 1840 and to an output receptacle 1830.

The image scanner 1840 and the transport mechanism 1820 are electronically coupled to a controller 1850. The controller 1850 controls the image scanner 1840, creates image files, and controls the transport mechanism 1820. The image scanner 1840 operates the same as the image scanner 450, described in FIG. 4. Images of the check 1800 are transmitted from the image scanner 1840 to a memory 1860, which stores the images in case later verification is required. Alternatively, the memory 1860 may not be used and the image of the check 1800 is transported directly to the first computer 130 at the payor bank as described in FIG. 1.

In this embodiment, the scanning system also includes a second input receptacle 1815 adapted to receive invoices. This is useful for situations where a customer is scanning checks and invoices to be paid by the checks. In this system, a second transport mechanism 1825 transports the invoices 1805 past a second image scanner 1845 and to an output receptacle 2035. The second image scanner 1845 is controlled by the controller and directs images to the memory 1860. The memory 1860 operates as described with reference to FIG. 4.

The second input receptacle 1815 may also be used to accept currency bills. This is useful if a customer wants to deposit funds as well as pay a check. Alternatively, one input receptacle may be for checks written by the customer to pay bills, and the other input receptacle may be for currency bills and checks written to the customer for deposit into the customer's account at the payor bank.

The controller 1850 also controls two control panels 1870, 1880. The control panels operate the same as the control panels 420, 430 in FIG. 4.

Figure 19:
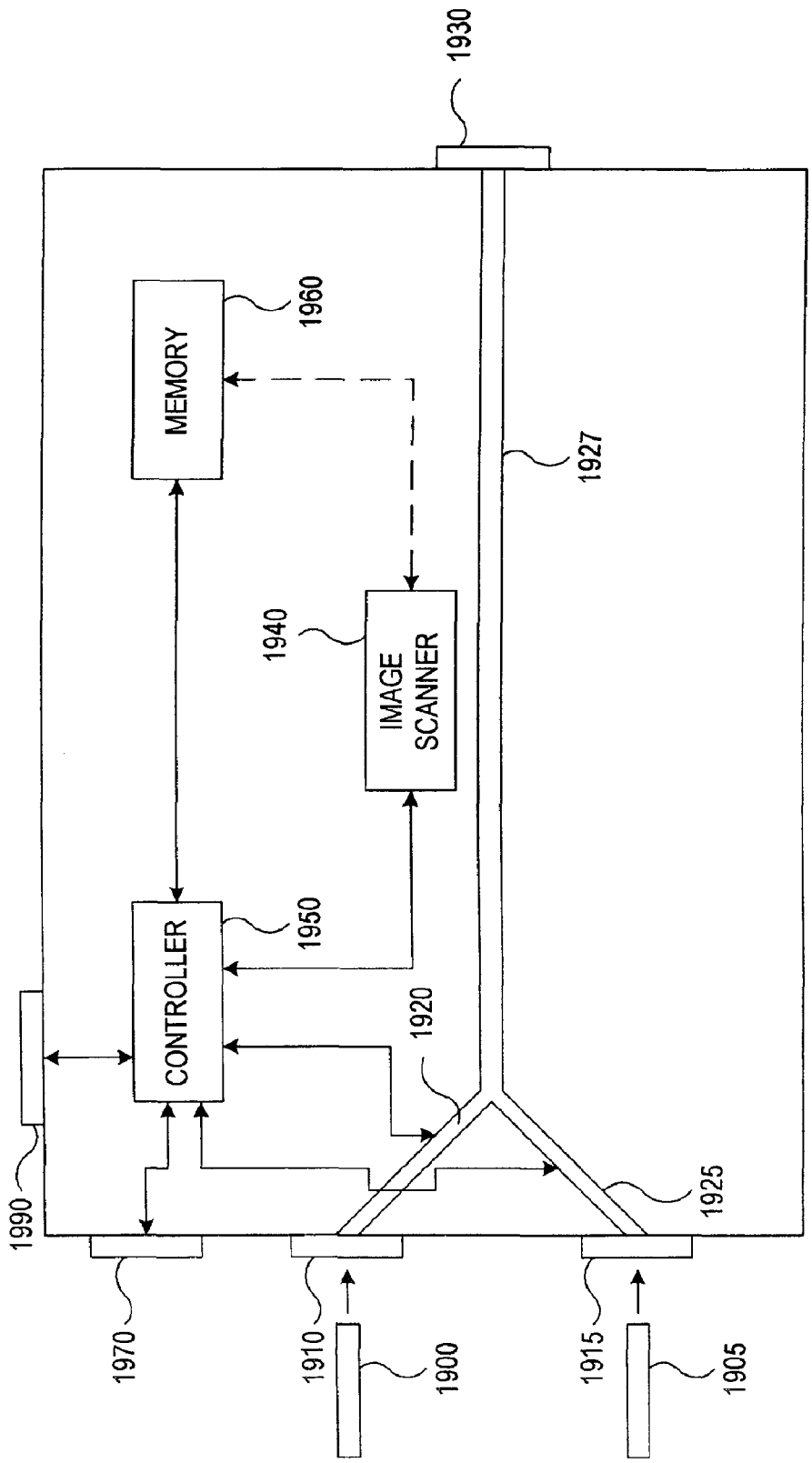
FIG. 19 is a functional block diagram of the components of a document scanning system according to another embodiment of the present invention.

Turning now to FIG. 19, another embodiment of a scanning system having two input receptacles is illustrated. In this embodiment, an invoice 1900 is inserted into a first input receptacle 1910. A first transport mechanism 1920 transports the invoice 1900 from the first input receptacle to a second transport mechanism 1927. The second transport mechanism 1927 transports the invoice 1900 past an image scanner 1940 and to an output receptacle 1930. A second input receptacle 1915 is also included in the scanning system and is adapted to receive a check 1905. A third transport mechanism 1925 transports the check 1905 from the second input receptacle 1915 to the second transport mechanism 1927. The second transport mechanism 1927 transports the check past the image scanner 1940 and to the output receptacle 1930.

The image scanner 1940 is adapted to obtain images of the invoice 1900 and the check 1905 as discussed above in relation to FIG. 4. The images of the invoice 1900 and the check 1905 are transmitted from the image scanner 1940 to a memory 1960, which operates the same as the memory 470 in FIG. 4. Also included in this scanning system are two control panels 1970, 1990, which operate like the control panels 420, 430 in FIG. 4. The two control panels 1970, 1990 are also controlled by the controller 2150.

In another embodiment, the invoices and checks for payment may be inserted via one input receptacle, while currency bills and checks for deposit are inserted via the other input receptacle.

Figure 20:
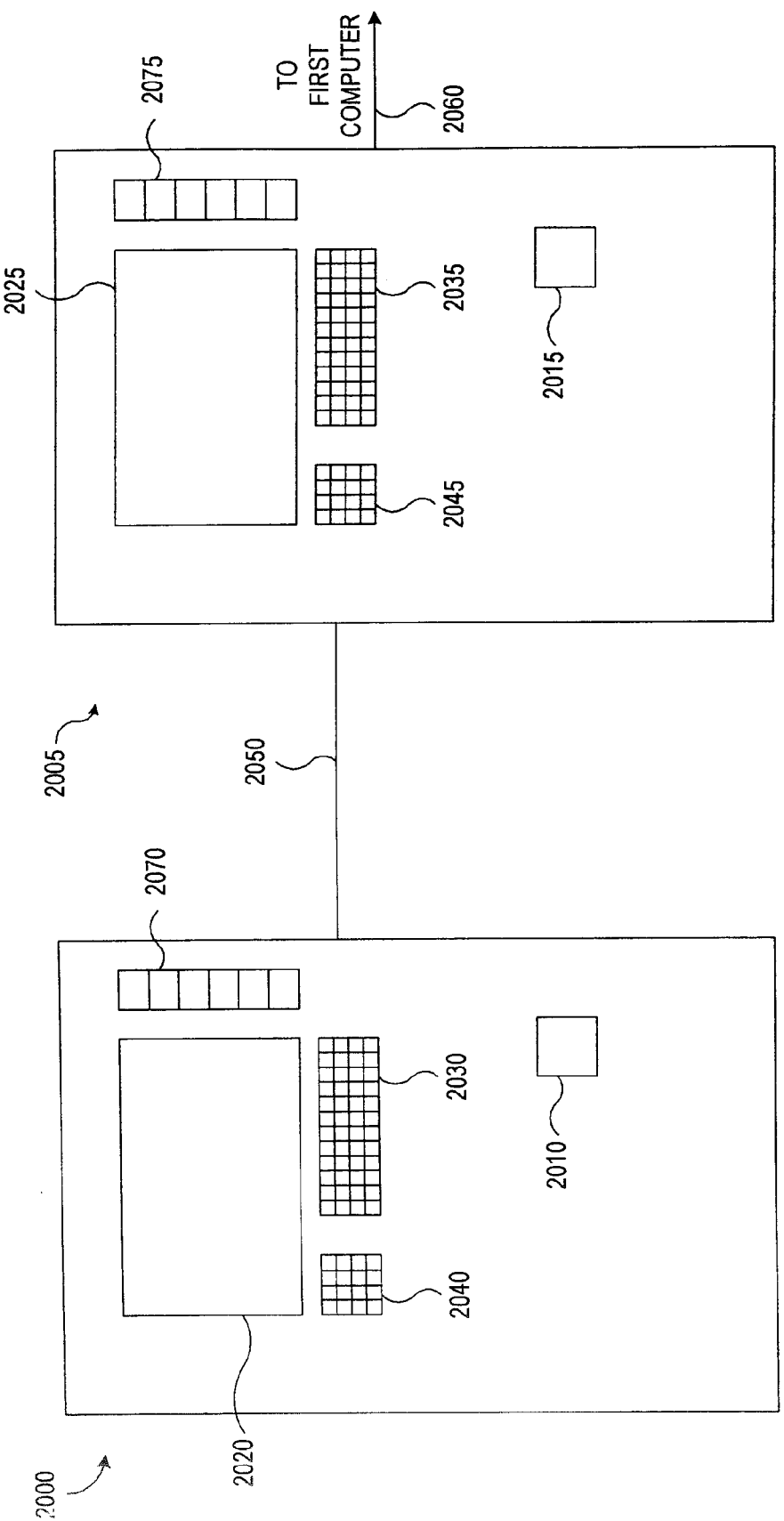
FIG. 20 is a block diagram of a document scanning system according to another embodiment of the present invention.

Turning now to FIG. 20, another embodiment of a scanning system will be described. In this embodiment, two scanning systems 2000, 2005 are linked via a communication link 2050, as defined in FIG. 1. The first scanning system 2000 includes a first input receptacle 2010 for receiving invoices. The first scanning system also includes a display 2020, a keyboard 2030, denomination keys 2070, and a ten-key keypad 2040. The display 2020 may be a video display screen, a touch screen, or other known display. The display 2020 may be used to display a questionable invoice or one that cannot be read by the image scanner. The customer or operator may then utilize the keypad 2040, the denomination keys 2070, and/or the keyboard 2030 to enter information into the image file. Alternatively, if the display 2020 is a touch screen, the customer may enter information on the touch screen.

The second scanning system 2005 includes many of the same features as the first scanning system 2000, such as an input receptacle 2015, a display 2025, a keypad 2045, denomination keys 2075, and a keyboard 2035. The second scanning system 2005, however, is adapted to receive checks into the input receptacle. The checks are then scanned by the scanning system.

In this embodiment, the invoices and checks are scanned by image scanners in the respective systems 2000, 2005 in the same manner as in FIG. 4. The images obtained from both the first and second scanning systems 2000, 2005 are then transmitted via a communication link 2060 to the first computer 130 as depicted in FIG. 1.

In an alternative embodiment, the invoices and checks may be inserted into the first scanning system 2000. The second scanning system 2005 may be used to accept documents for depositing, such as currency bills and checks written to the customer.

All of the embodiments discussed above, which accept both checks written by and to the customer, are beneficial because these embodiments allow one system to be used for a variety of functions. For example, a customer who needs to both pay a bill and deposit a check need only find one machine to do both. It is also contemplated that the document scanning device of FIG. 4 may also accept checks for payment and checks and currency bills for deposit.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An automated payment system for processing payment of an invoice sent from a payee to a customer, wherein the customer has a bank account at a payor bank, the automated payment system comprising:
   a document processing system including:
      an input receptacle for receiving the invoice,
      an image scanner configured to generate image data from the received invoice, the image data reproducible as a visually readable image of the invoice,
      a transport mechanism configured to transport the invoice from the input receptacle and past the image scanner, and
      at least one processor associated with the image scanner, the at least one processor configured to extract field information from the image data of the invoice, the field information including an amount due on the invoice; and
   an interface coupled to the document processing system, the interface configured to transmit the image data and extracted field information to a network, the transmitted image data and field information formatted for processing by a computer associated with a payor bank and for debiting of the customer bank account for the extracted amount due.

2. The system of claim 1, further comprising a personal computer coupled to the document processing system and configured to receive the invoice image data and the extracted field information.

3. The system of claim 1, wherein the document processing system further includes a value entry device configured to receive a transaction amount.

4. The system of claim 3, wherein the document processing system is further configured to compare the extracted amount due on the invoice with the transaction amount received via the value entry device.

5. The system of claim 3, wherein the value entry device is a numeric keypad.

6. The system of claim 3, wherein the value entry device is a touch screen.

7. The system of claim 1, wherein the document processing system further includes at least one control panel configured to display information to one of an operator or a customer.

8. The system of claim 1, wherein the image scanner further includes multiple scan heads.

9. The system of claim 1, wherein the document processing system is configured to transport and scan the invoice with a longer edge of the invoice perpendicular to the direction of transport.

10. The system of claim 1, wherein the generated image data is reproducible as a full image of at least one side of the invoice.

11. An automated payment system for processing payment of an invoice sent from a payee to a customer, wherein the customer has a bank account at a payor bank and the payee has a bank account at a payee bank, the automated payment system comprising:
   a payor bank computer configured to receive invoice image data, the invoice image data reproducible as a visually readable image of the invoice, the payor bank computer or a processor configured to extract field information from the invoice image data, the field information including an amount due on the invoice; and
   a communications interface associated with the payor bank computer or the processor, the communications interface configured to transmit funds for the extracted amount due on the invoice from the payor bank computer to a network, wherein the transmitted funds are formatted for processing by a payee bank computer to credit the payee bank account the amount of the transmitted funds.

12. The system of claim 11, wherein the payor bank and the payee bank are different banks.

13. The system of claim 11, wherein the payor bank and the payee bank are the same bank.

14. A method of debiting a first financial account and crediting a second financial account, the first financial account belonging to a customer and the second financial account belonging to a payee, the method comprising:
   receiving an invoice in the input receptacle of a document scanning system, the received invoice referencing the second financial account;
   transporting the invoice past an image scanner of the document scanning system;
   scanning the invoice with the image scanner to generate electronic image data of the invoice, the electronic image data being reproducible as a visually readable image of the invoice;
   extracting account information and an amount due from the electronic image data of the invoice;
   transmitting the image data, the obtained account information, and the amount due to an interface connected to a network, wherein the image, the account information, and the amount due are formatted for processing by a payor financial institution associated with the first financial account and debiting of the first financial account for the amount due; and
   transmitting funds equal to the transaction amount via the interface or another interface configured to transmit the funds to a network, the transmitted funds formatted for processing by a payee financial institution associated with the second financial account.

15. The system of claim 14, wherein the received invoice image data is reproducible as a full image of at least one side of the invoice.

16. The method of claim 14, wherein the payor financial institution and the payee financial institution are different financial institutions.

17. The method of claim 14, wherein the payor financial institution and the payee financial institution are the same.

18. The method of claim 14, further comprising receiving a transaction amount via a value entry device, and comparing the extracted amount due with the transaction amount received via the value entry device.

19. The method of claim 14, wherein the invoice is transported and scanned with a longer edge of the invoice perpendicular to the direction of transport.

20. The method of claim 14, wherein the generated electronic image data is reproducible as a full image of at least one side of the invoice.

* * * * *